US008703295B2

(12) United States Patent
Zou et al.

(10) Patent No.: US 8,703,295 B2
(45) Date of Patent: Apr. 22, 2014

(54) GLASS MATERIAL FOR MOLD PRESSING, METHOD FOR MANUFACTURING SAME, AND METHOD FOR MANUFACTURING OPTICAL GLASS ELEMENT

(75) Inventors: Xuelu Zou, Shinjuku-ku (JP); Yasuhiro Fujiwara, Shinjuku-ku (JP); Hiroshi Kohno, Shinjuku-ku (JP); Kohichiro Shiraishi, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 1103 days.

(21) Appl. No.: 12/295,610

(22) PCT Filed: Mar. 28, 2007

(86) PCT No.: PCT/JP2007/056669
§ 371 (c)(1),
(2), (4) Date: May 6, 2009

(87) PCT Pub. No.: WO2007/114170
PCT Pub. Date: Oct. 11, 2007

(65) Prior Publication Data
US 2010/0292066 A1    Nov. 18, 2010

(30) Foreign Application Priority Data
Mar. 31, 2006    (JP) ................... 2006-096787

(51) Int. Cl.
*B32B 17/06* (2006.01)
*B32B 15/04* (2006.01)

(52) U.S. Cl.
USPC ........... 428/432; 428/426; 428/428; 428/688; 428/689; 428/697; 428/699; 428/701; 428/702

(58) Field of Classification Search
USPC ......... 428/426, 428, 688, 689, 701, 702, 432, 428/697, 699
See application file for complete search history.

(56) References Cited

U.S. PATENT DOCUMENTS

| | | | | |
|---|---|---|---|---|
| 5,168,404 A | * | 12/1992 | Miyazaki et al. | 359/718 |
| 5,192,352 A | * | 3/1993 | Kuwabara et al. | 65/60.53 |
| 5,843,200 A | * | 12/1998 | Richards | 65/102 |
| 5,851,252 A | * | 12/1998 | Sato et al. | 65/24 |
| 8,206,830 B2 | * | 6/2012 | Zou et al. | 428/426 |
| 8,486,536 B2 | * | 7/2013 | Zou et al. | 428/428 |
| 2003/0159467 A1 | * | 8/2003 | Hirota et al. | 65/26 |
| 2003/0209035 A1 | * | 11/2003 | Fujiwara et al. | 65/24 |
| 2004/0082460 A1 | * | 4/2004 | Yamane et al. | 501/48 |
| 2004/0138043 A1 | * | 7/2004 | Kasuga et al. | 501/45 |
| 2005/0054511 A1 | * | 3/2005 | Fujiwara et al. | 501/45 |
| 2005/0188724 A1 | * | 9/2005 | Ikenishi et al. | 65/31 |
| 2005/0204776 A1 | * | 9/2005 | Hayashi | 65/102 |
| 2007/0060464 A1 | * | 3/2007 | Ikenishi et al. | 501/48 |
| 2012/0135199 A1 | * | 5/2012 | Satou et al. | 428/172 |
| 2012/0177914 A1 | * | 7/2012 | Igari et al. | 428/336 |

FOREIGN PATENT DOCUMENTS

| | | | |
|---|---|---|---|
| JP | 60033221 | * | 2/1985 |
| JP | 62-202824 A | | 9/1987 |
| JP | 62-297225 A | | 12/1987 |
| JP | 04-083724 A | | 3/1992 |
| JP | 2003-089533 A | | 3/2003 |
| JP | 2003-160356 A | | 6/2003 |
| JP | 2003-313046 A | | 11/2003 |
| JP | 2003-335549 A | | 11/2003 |
| JP | 2005-263570 A | | 9/2005 |
| JP | 2006-193389 A | | 7/2006 |

OTHER PUBLICATIONS

JP60033221 Patent Abstracts of Japan.*
Japanese Office Action corresponding to Japanese Patent Application No. 2006-096787, dated Jan. 17, 2012.
Office Action issued in corresponding Chinese Patent Application No. 201110439059.7 dated Nov. 27, 2013.

* cited by examiner

Primary Examiner — David Sample
Assistant Examiner — Lauren Colgan
(74) Attorney, Agent, or Firm — Sughrue Mion, PLLC

(57) ABSTRACT

A glass material for mold pressing, comprised of a core portion and a covering portion. In one embodiment, the core portion comprises a multicomponent optical glass containing at least one readily reducible component selected from among W, Ti, Bi, and Nb and the covering portion comprises a multicomponent glass containing none or a lower quantity of the readily reducible component than is contained in the core portion. In another embodiment, the core portion comprises a fluorine-containing multicomponent optical glass, and the covering portion comprises a multicomponent glass containing none or a lower quantity of fluorine than is contained in the core portion. A method for manufacturing an optical glass element employing the above glass material that comprises heat softening a glass material that has been preformed into a prescribed shape, and conducting press molding with a pressing mold.

15 Claims, No Drawings

GLASS MATERIAL FOR MOLD PRESSING, METHOD FOR MANUFACTURING SAME, AND METHOD FOR MANUFACTURING OPTICAL GLASS ELEMENT

CROSS-REFERENCE TO RELATED PATENT APPLICATIONS

The present application claims priority under Japanese Patent Application 2006-96787, filed on Mar. 31, 2006, the entire contents of which are hereby incorporated herein by reference.

TECHNICAL FIELD

The present invention relates to a glass material employed to obtain an optical element by precision mold pressing, and a method for manufacturing an optical element employing this glass. More particularly, even when employing a glass material containing components that are highly reactive (readily reducible components or components reacting with the pressing surface) at pressing temperatures, the present invention can be applied to the stable and efficient production of optical elements affording adequate optical performance and to the extension of the service life of the pressing mold while inhibiting reaction of the pressing surface due to such components and primarily preventing fusion, clouding, and scratch-like reaction marks on the surface of the molded product.

BACKGROUND ART

The obtaining of optical elements such as glass lenses by precision mold pressing is known. Optically functional surfaces molded by press molding afford desired optical performance without requiring mechanical processing such as polishing.

Patent Document 1 (Japanese Unexamined Patent Publication (KOKAI) Heisei No. 08-277125, the entire contents of which are hereby incorporated herein by reference) describes a method of forming a coating of a group IIIa metal oxide on the surfaces of a glass lens molding material on which functional surfaces are to be molded. The prevention of fusion of the molding-use material and outer surface of the mold is disclosed.

Patent Document 2 (Japanese Unexamined Patent Publication (KOKAI) Showa No. 62-226825, the entire contents of which are hereby incorporated herein by reference) describes a method of press molding a glass product in a softened state using a mold comprised of glass having a glass transition temperature higher than the pressing temperature, in which a fusion-preventing layer is inserted between the molded glass product having a shape constituting the foundation of the finished shape of the lens and the mold.

Based on the method described in Patent Document 1, a metal oxide coating of a group IIIa element in the Periodic Table of the Elements, such as yttrium oxide, cerium oxide, or lanthanum oxide, is formed in advance on surfaces of the glass material on which functional surfaces are to be molded and press molding is conducted. $SiO_2$—$B_2O_3$—$La_2O_3$ glass, $P_2O_5$—$TiO_2$—$Nb_2O_5$ glass, and the like are described as the glass material for molding.

However, the physical properties of the above metal oxide coating differ greatly from those of the glass material. Since softening is not identical over the temperature range at which the glass material softens, when the glass material is pressed by the pressing surfaces of the pressing mold to deform during press molding, it cannot extend by flexibly following the deformation. In addition, during the subsequent cooling process, the shrinkage rate (thermal expansion rate) differs from that of the glass material, ending up producing breaks in the coating. As a result, it becomes impossible to prevent the glass material from being partially pressed directly against the pressing surface, creating a problem in that fusion cannot be prevented.

The method described in Patent Document 2 prevents fusion between the glass and the mold occurring when molding glass lenses with a mold made of glass by inserting a fusion-preventing layer between them.

Based on investigation, the present inventors discovered that, distinct from the fusion occurring between glass and mold when press molding a glass material with a mold made of glass, when the glass material contains specific components, and even when a mold made of a material other than glass is employed, an interface reaction occurs due to the components, making it difficult to obtain optical components of adequate performance.

When the above undesirable interface reaction occurs during the molding of an optical glass element by precision mold pressing, it causes scratch-like reaction marks on the glass surface, clouding, and wear and tear of the pressing mold, precluding the satisfactory molding of a glass element such as a lens affording good optical performance and external appearance.

Based on the application of the optical element obtained by molding, various optical constants and physical and chemical properties may be desirable in a glass material employed in precision mold pressing. In particular, optical glasses of high refraction (for example, an nd of 1.7 or higher) and high dispersion (v(nu)d of 35 or lower), which are useful in small image pickup apparatuses and the like, and optical glasses of high refraction (same as above) and low dispersion (such as a v(nu)d of 65 or higher), are valued in such image pickup apparatuses and the like, so the need is great. The present inventors have developed a highly refractive glass capable of filling this requirement.

The use of W, Ti, Bi, and Nb as glass components is advantageous for achieving a high refractive index. However, since these components can assume a number of valences when present as glass components, they tend to produce an oxidation reduction reaction and are readily reduced by the atmosphere and temperature in the course of press molding, for example. In a glass material containing such typical highly reactive components, various interface reactions take place in the deformation process while being pressed by the pressing mold at the pressing temperature. Fusion to the pressing mold, clouding of the surface of the glass molded product, and residual scratch-like reaction marks have been discovered. The pressing surface is roughened by fusion, the transferal of this roughness produces irregularities in the surface of the molded product, and a tendency toward clouding has been observed.

Imparting abnormal dispersion to an optical element is advantageous to correct chromatic aberration in optical apparatuses. To this end, fluorine-containing optical glass is usefully employed. However, when a glass material comprised of fluorine-containing optical glass is press molded, contamination of mold surfaces due to volatilization of the fluorine on the pressing surface and clouding of the molded product tend to occur. Further, when a metal is incorporated into the pressing surface (often when a metal mold release film is provided on a pressing surface), there is a strong reaction with the fluorine, and a tendency for scratch-like reaction marks to occur on the lens surface has been observed.

Accordingly, the present invention has for its object to permit the stable production of optical elements affording adequate optical performance by using optical glass containing these components and inhibiting undesirable interface reactions during press molding.

DISCLOSURE OF THE INVENTION

The means of achieving the object of the present invention are as follows:

[1] A glass material for mold pressing, comprised of a core portion comprised of a multicomponent optical glass containing at least one readily reducible component selected from among W, Ti, Bi, and Nb (referred to as the "first glass" hereinafter), and a covering portion covering the surface of said core portion, comprised of a multicomponent glass containing none or a lower quantity of said readily reducible component than is contained in said core portion (referred to as the "second glass" hereinafter).

[2] The glass material in accordance with [1], wherein said first glass contains a total of 5 mol percent or more of said readily reducible component.

[3] The glass material in accordance with [1] or [2], wherein said first glass is an optical glass comprising 15 to 45 percent of $P_2O_5$, 3 to 35 percent of $Nb_2O_5$, 2 to 35 percent of $Li_2O$, 0 to 20 percent of $TiO_2$, 0 to 40 percent of $WO_3$, 0 to 20 percent of $Bi_2O_3$, 0 to 30 percent of $B_2O_3$, 0 to 25 percent of BaO, 0 to 25 percent of ZnO, 0 to 20 percent of MgO, 0 to 20 percent of CaO, 0 to 20 percent of SrO, 0 to 30 percent of $Na_2O$, 0 to 30 percent of $K_2O$ (where the total quantity of $Li_2O$, $Na_2O$, and $K_2O$ is 45 percent or less), 0 to 15 percent of $Al_2O_3$, 0 to 15 percent of $SiO_2$, 0 to 10 percent of $La_2O_3$, 0 to 10 percent of $Gd_2O_3$, 0 to 10 percent of $Yb_2O_3$, 0 to 10 percent of $ZrO_2$, and 0 to 10 percent of $Ta_2O_5$.

[4] The glass material in accordance with [1] or [2], wherein said first glass is an optical glass comprising, denoted as mol percentages, 0 to 40 percent of $SiO_2$, 4 to 50 percent of $Bi_2O_3$, 0 to 30 percent of $Li_2O$, 0 to 25 percent of $Na_2O$, 0 to 20 percent of $K_2O$, 0 to 40 percent of ZnO, 0 to 15 percent of CaO, 0 to 15 percent of BaO, 0 to 15 percent of SrO, 0 to 20 percent of MgO, 1 to 25 percent of $La_2O_3$, 0 to 20 percent of $Gd_2O_3$, 0 to 15 percent of $Yb_2O_3$, 0 to 30 percent of $Nb_2O_3$, 0 to 20 percent of $WO_3$, 0 to 40 percent of $TiO_2$, and 0 to 20 percent of $Bi_2O_3$.

[5] A glass material for mold pressing comprising a core portion comprised of a fluorine-containing multicomponent optical glass (referred to as the "third glass" hereinafter) and a covering portion covering the surface of said core portion, comprised of a multicomponent glass containing none or a lower quantity of fluorine than is contained in said core portion (referred to as the "fourth glass" hereinafter).

[6] The glass material in accordance with [5], characterized in that said third glass comprises, denoted as mol percentages, 10 to 45 percent of $P^{5+}$, 5 to 30 percent of $Al^{3+}$, 0 to 5 percent of $Y^{5+}$, 0 to 5 percent of $La^{5+}$, 0 to 5 percent of $Gd^{5+}$, 0 to 20 percent of $Mg^{2+}$, 0 to 25 percent of $Ca^{2+}$, 0 to 30 percent of $Sr^{2+}$, 0 to 30 percent of $Ba^{2+}$, 0 to 20 percent of $Zn^{2+}$, 0 to 30 percent of $Li^+$, 0 to 15 percent of $Na^+$, 0 to 15 percent of $K^+$, 0 to 10 percent of $B^{5+}$, and an $F^{31}/(F^-O^{2-})$ ratio of 0.25 to 0.95.

[7] The glass material in accordance with any one of [1] to [6], wherein glasses are selected so that the glass transition temperatures Tg of the first, second, third, and fourth glasses, denoted as Tg1, Tg2, Tg3, and Tg4, respectively, and the sag temperatures Ts of the first and third glasses, denoted as Ts1 and Ts3, respectively, satisfy the following relation:

$$Tg1 < Tg2 < Ts1 \quad (1)$$

or $$Tg3 < Tg4 < Ts3 \quad (2).$$

[8] The glass material in accordance with any one of [1] to [6], wherein glasses are selected so that the glass transition temperatures Tg of the first, second, third, and fourth glasses, denoted as Tg1, Tg2, Tg3, and Tg4, respectively, and the sag temperatures Ts of the second and fourth glasses, denoted as Ts2 and Ts4, respectively, satisfy the following relation:

$$Tg2 \leq Tg1 \leq Ts2 \quad (3)$$

or $$Tg4 \leq Tg3 \leq Ts4 \quad (4).$$

[9] The glass material in accordance with any one of [1] to [8], wherein glasses are selected so that the glass transition temperatures Tg of the first, second, third, and fourth glasses, denoted as Tg1, Tg2, Tg3, and Tg4, respectively, satisfy the following relation:

$$Tg1-20°C. < Tg2 < Tg1+20°C. \quad (5)$$

or $$Tg3-20°C. < Tg4 < Tg3 +20°C. \quad (6).$$

[10] The glass material in accordance with any one of [1] to [6], wherein glasses are selected so that the glass transition temperatures Tg of the first, second, third, and fourth glasses, denoted as Tg1, Tg2, Tg3, and Tg4, respectively; the sag temperatures Ts of the first and third glasses, denoted as Ts1 and Ts3, respectively; and the temperatures at which the first and third glasses exhibit a viscosity of $1/1,000$ or more the viscosity exhibited at the softening point of the respective glasses (viscosity=$10^{7.6}$ dPa.s), denoted as T1 (where T1>Ts1) and T3 (wherein T3>Ts3), respectively, satisfy the following relation:

$$Ts1 < Tg2 < T1$$

or $$Ts3 < Tg4 < T3.$$

[11] The glass material in accordance with any one of [1] to [6], wherein glasses are selected so that the glass transition temperatures Tg of the first, second, third, and fourth glasses, denoted as Tg1, Tg2, Tg3, and Tg4, respectively; the sag temperatures Ts of the second and fourth glasses, denoted as Ts2 and Ts4, respectively; and the temperatures at which the second and fourth glasses exhibit a viscosity of $1/100$ or more the viscosity exhibited at the softening point of the respective glasses (viscosity=$10^{7.6}$ dPa.s), denoted as T2 (where T2>Ts2) and T4 (where T4>Ts4), respectively, satisfy the following relation:

$$Ts2 < Tg1 < T2$$

or $$Ts4 < Tg3 < T4.$$

[12] The glass material in accordance with any one of [1] to [11], wherein glasses are selected so that the glass transition temperatures Tg of the first, second, third, and fourth glasses, denoted as Tg1, Tg2, Tg3, and Tg4, respectively, satisfy the following relation:

$$(Tg1-120° C.) < Tg2 < 800° C. \quad (7)$$

or $$(Tg3-120° C.) < Tg4 < 800° C. \quad (8).$$

[13] The glass material in accordance with any one of [1] to [12], wherein glasses are selected so that the average coefficients of linear expansion at 100 to 300° C. of the first, second, third, and fourth glasses, denoted as α(alpha)h1, α(alpha)h2, α(alpha)h3, and α(alpha)h4, satisfy the following relations:

$$\alpha(alpha)h2 \times 0.8 \leq \alpha(alpha)h1 \leq \alpha(alpha)h2 \times 1.2 \quad (9)$$

$$\alpha(alpha)h4 \times 0.8 < \alpha(alpha)h3 < \alpha(alpha)h4 \times 1.2 \quad (10).$$

[14] The glass material in accordance with any one of [1] to [13], wherein the ratio of the weight reduction rate of the second and fourth glasses to that of the first and third glasses when subjected to a prescribed acid or alkali treatment is 10 or more.

[15] The glass material in accordance with any one of [1] to [14], wherein the etching rates of the first and third glasses, denoted as D1 and D3, respectively, and the etching rates of the second and fourth glasses, denoted as D2 and D4, respectively, are such that:

$$D1 > D2 \text{(wherein } D1=0.01 \text{ to } 0.50 \text{ and } D2=0.000 \text{ to } 0.05) \text{ and}$$

$$D3 > D4 \text{(wherein } D3=0.01 \text{ to } 0.50 \text{ and } D4=0.000 \text{ to } 0.05).$$

[16] The glass material in accordance with any one of [1] to [15], characterized in that a carbon-containing film is present on the surface of the covering portion.

[17] A method for manufacturing an optical glass element comprising heat softening a glass material that has been preformed into a prescribed shape, and conducting press molding with a pressing mold, characterized by employing a glass material in accordance with any one of [1] to [16].

[18] The manufacturing method in accordance with [17], characterized in that a carbon-containing mold release film is provided on the pressing surface of the pressing mold.

[19] The manufacturing method in accordance with [18], characterized in that a metal-containing mold release film is provided on the pressing surface of the pressing mold.

[20] The manufacturing method in accordance with any one of [17] to [19], characterized in that the second or fourth glass is removed from the surface of a molded product manufactured by press molding.

[21] The manufacturing method in accordance with any one of [17] to [19], characterized in that the second or fourth glass is not removed from the surface of a pressing mold manufactured by press molding, and in that an antireflective film is formed.

The present invention permits the stable production with good yield of high-precision optical elements in a manner effectively inhibiting the surface reactions that tend to take place in the course of press molding, even when employing an optical glass containing readily reducible components or volatile components. The advantages of inhibiting the deterioration of the pressing mold surface and increasing the service life are also afforded.

BEST MODES OF CARRYING OUT THE INVENTION

The present invention is a glass material for mold pressing, comprised of a core portion comprised of a multicomponent optical glass containing at least one readily reducible component selected from among W, Ti, Bi, and Nb (referred to as the "first glass" hereinafter), and a covering portion covering the surface of said core portion, comprised of a multicomponent glass containing none or a lower quantity of said readily reducible component than is contained in said core portion (referred to as the "second glass" hereinafter).

The present invention is also a glass material for mold pressing comprising a core portion comprised of a fluorine-containing multicomponent optical glass (referred to as the "third glass" hereinafter) and a covering portion covering the surface of said core portion, comprised of a multicomponent glass containing none or a lower quantity of fluorine than is contained in said core portion (referred to as the "fourth glass" hereinafter).

Covering by the covering portion means that at least a portion of the surface of the core portion is covered. Preferably, the entire surface area of the core portion is essentially covered, but the coverage rate and positions covered can be selected. For example, when a reaction tends to take place at the interface with the center of the pressing surface, ⅕ or more of the surface area of the core portion, a region that includes the center portion, can be covered.

[Glass Material for Mold Pressing of Glass Containing Readily Reducible Components]

The First Glass

The first glass employed in the present invention will be described below. In the present invention, the first glass is an optical glass containing any of W, Ti, Bi, and Nb. Specifically, when the total content thereof is 5 mol percent or greater (for example, 5 to 60, preferably 15 to 55 mol percent), the method of the present invention is particularly useful. The first glass desirably contains 3 mol percent or more of W; by incorporating 4 to 15 mol percent, for example, the effect of the present invention is pronounced.

As a specific example, the first glass is an optical glass containing 15 to 45 percent of $P_2O_5$, 3 to 35 percent of $Nb_2O_5$, 2 to 35 percent of $Li_2O$, 0 to 20 percent of $TiO_2$, 0 to 40 percent of $WO_3$, 0 to 20 percent of $Bi_2O_3$, 0 to 30 percent of $B_2O_3$, 0 to 25 percent of BaO, 0 to 25 percent of ZnO, 0 to 20 percent of MgO, 0 to 20 percent of CaO, 0 to 20 percent of SrO, 0 to 30 percent of $Na_2O$, 0 to 30 percent of $K_2O$ (where the total quantity of $Li_2O$, $Na_2O$, and $K_2O$ is 45 percent or less), 0 to 15 percent of $Al_2O_3$, 0 to 15 percent of $SiO_2$, 0 to 10 percent of $La_2O_3$, 0 to 10 percent of $Gd_2O_3$, 0 to 10 percent of $Yb_2O_3$, 0 to 10 percent of $ZrO_2$, and 0 to 10 percent of $Ta_2O_5$.

The above composition will be described in detail.

$P_2O_5$ is a substance constituting the network structure of the glass, imparting manufacturable stability to the glass. When the $P_2O_5$ content exceeds 45 mol percent, the glass transition temperature and sag temperature increase and weatherability tends to deteriorate. At less than 15 mol percent, the glass develops a strong tendency to devitrify and tends to become unstable. Thus a range of 15 to 45 mol percent is desirable, and a range of 17 to 40 percent is preferred.

$Nb_2O_5$ imparts characteristics such as a high refractive index and high dispersion. When the quantity incorporated exceeds 35 mol percent, the glass transition temperature and sag temperature rise, stability and high-temperature melting properties deteriorate, and bubbles and coloration tend to develop during precision pressing. When the quantity incorporated is less than 3 percent, the durability of the glass deteriorates and it becomes difficult to achieve a desired high refractive index. Thus, a quantity falling within the range of 3 to 35 percent is desirable, with the range of 5 to 30 percent being preferred.

$Li_2O$ is a component that effectively lowers the glass transition temperature. It tends less than other alkalis to lower the refractive index or cause deterioration of durability. When the quantity incorporated is less than 2 percent, the transition temperature tends not to drop; when greater than 35 percent, the durability of the glass tends to deteriorate. Thus, a quantity ranging from 2 to 35 percent is desirably incorporated, with a range of 5 to 30 percent being preferred.

$TiO_2$ imparts a high refractive index and high dispersibility, and enhances devitrification stability. When the content incorporated exceeds 20 percent, the glass devitrification and transmittance tend to deteriorate, the sag temperature and liquidus temperature rise, and coloration of the glass during precision press molding tends to occur. Thus, a range of 0 to 20 percent is desirable and 0 to 15 percent is preferred.

$WO_3$ is a component that effectively imparts a high refractive index and high dispersion characteristics and a low temperature softening property. $WO_3$ functions to lower the glass transition temperature and sag temperature and raise the refractive index in the same manner as alkali metal oxides. It also has the effect of inhibiting wetting of the pressing mold by the glass, and thus has the effect of improving the mold release property of the glass in precision press molding. When an excessive quantity of $WO_3$ is incorporated, such as a quantity exceeding 40 percent, the glass tends to develop coloration and the high temperature viscosity of the glass decreases, making it difficult to undergo hot forming of glass spheres. Accordingly, the content is desirably kept to 0 to 40 percent, preferably a range of 0 to 35 percent, more preferably a range of 2 to 35 percent, still more preferably a range of 3 to 35 percent, and yet more preferably, a range of 4 to 35 percent.

To inhibit the tendency of a high refractive index glass to crystallize, $WO_3$ is desirably incorporated in a proportion of 1 mol percent or greater—for example, 3 mol percent or greater—and is advantageously incorporated in a proportion of 4 to 15 mol percent.

$Bi_2O_3$ is a component that imparts a high refractive index and high dispersibility, and has the effects of stabilizing and broadening the glass generation range. Accordingly, the introduction of $Bi_2O_3$ permits vitrification of even glasses of low $P_2O_5$ content. The incorporation of $Bi_2O_3$ also increases the wetting angle of molten glass against platinum. Increasing the wetting angle helps prevent the formation of surface striae during hot forming of glass spheres using platinum outflow pipes, and preventing wetting also enhances weight precision. When the quantity incorporated exceeds 20 percent, the glass both tends to devitrify and develop coloration. Thus, the $Bi_2O_3$ content is desirably 0 to 20 percent, preferably 0 to 15 percent. To achieve these effects by introducing $Bi_2O_3$, the quantity of $Bi_2O_3$ within the above-stated range is desirably 0.2 percent or greater, preferably 0.5 percent or greater.

$B_2O_3$ is effective for enhancing the melting properties of the glass and rendering the glass homogenous. The introduction of a small quantity changes the bonding properties of OH present within the glass, having the effect of inhibiting glass bubbling during precision press molding. When $B_2O_3$ is incorporated in a quantity exceeding 30 percent, the weatherability of the glass deteriorates and the glass tends to become unstable. Thus, a quantity of 0 to 30 percent is desirable, with a range of 0 to 25 percent being preferred.

BaO is a component that has the effects of imparting a high refractive index, enhancing devitrification stability, and lowering the liquidus temperature. When incorporating $WO_3$, particularly a large quantity of $WO_3$, the incorporation of BaO has the effects of inhibiting glass coloration and enhancing devitrification stability. When a small quantity of $P_2O_5$ is incorporated, the incorporation of BaO has the effect of enhancing the weatherability of the glass. When the quantity of BaO incorporated exceeds 25 percent, the glass becomes unstable and the transition temperature and sag temperature rise. Thus, BaO is desirably incorporated in a quantity of 0 to 25 percent, preferably 0 to 20 percent.

ZnO is a component that can be incorporated to increase the refractive index and dispersion of the glass. The introduction of a small quantity of ZnO has the effect of lowering the glass transition temperature, sag temperature, and liquidus temperature. However, the introduction of an excessive quantity causes marked deterioration of devitrification stability and runs the risk of raising the liquidus temperature. Accordingly, ZnO is desirably incorporated in a quantity of 0 to 25 percent, preferably within a range of 0 to 20 percent, and still more preferably, within a range of 0 to 15 percent.

MgO, CaO, and SrO are components incorporated to adjust the stability and weatherability of the glass. However, when incorporated in excessive quantity, the glass becomes unstable. Thus, the quantity of each that is incorporated is desirably kept to 0 to 20 percent, preferably 0 to 15 percent.

$Na_2O$ and $K_2O$ are both components that can be incorporated to enhance the devitrification stability of the glass, lower the glass transition temperature, yield temperature, and liquidus temperature, and enhance the melting properties of the glass. However, when the quantity of either $Na_2O$ or $K_2O$ exceeds 30 percent, or the total quantity with $Li_2O$, $Na_2O$, and $K_2O$ exceeds 45 percent, not only does the stability of the glass deteriorate, but there is a risk of deterioration of glass weatherability and durability. Thus, the individual quantities of $Na_2O$ and $K_2O$ incorporated are each desirably kept to 0 to 30 percent, with the total quantity of $Li_2O$, $Na_2O$, and $K_2O$ desirably being 0 to 45 percent. Preferably, the quantity of $Na_2O$ is kept to 0 to 20 percent, that of $K_2O$ to 0 to 25 percent, and that of $Na_2O$ to 0 to 5 weight percent.

$Al_2O_3$, $SiO_2$, $La_2O_3$, $Gd_2O_3$, $Yb_2O_3$, $ZrO_2$, and $Ta_2O_3$ are components that can be incorporated to adjust the stability and optical constants of the glass. However, these components all raise the glass transition temperature, presenting the risk of compromising precision press molding properties. Accordingly, the quantity of each of $Al_2O_3$ and $SiO_2$ incorporated is desirably kept to 15 percent or lower, and the quantity of each of $La_2O_3$, $Gd_2O_3$, $Yb_2O_3$, $ZrO_2$, and $Ta_2O_3$ is desirably kept to 0 to 10 percent. The quantity of each of $Al_2O_3$ and $SiO_2$ incorporated is preferably kept to 0 to 12 percent, and the quantity of each of $La_2O_3$, $Gd_2O_3$, $Yb_2O_3$, $ZrO_2$, and $Ta_2O_3$ is desirably kept to 0 to 8 percent.

Additionally, $Sb_2O_3$ is effective as a class clarifying agent. However, when added in a quantity exceeding 1 percent, the glass tends to develop bubbles during press molding. Thus, it suffices to incorporate a quantity of 0 to 1 percent. Other components such as $TeO_2$ and $Cs_2O$ can also be incorporated in a total quantity of up to 5 percent to the extent that the object of the present invention is not lost. However, $TeO_2$ is toxic, and is thus desirably not employed at all from the perspective of environmental impact. Similarly, compounds such as PbO, $As_2O_3$, CdO, $Tl_2O$, radioactive substances, Cr, and Hg are desirably not employed.

Since high refraction and high dispersion can be achieved when the above-described first glass has a refractive index nd of 1.7 or greater and an Abbé number v(nu)d of 35 or lower, desirably 30 or lower, and preferably, 25 or lower, such glasses are high value-added glasses of great importance.

However, the components (W, Ti, Bi, Nb) that are incorporated to achieve such useful optical constants tend to be reduced and have high reactivity during the press molding process. That is, reactions tend to take place at low temperature at the interface between the glass surface and the surface of the pressing mold. As a result, clouding, scratchlike reaction marks, and fusion to the pressing surface tend to occur on the surface of the molded product obtained, tending to produce an optical element of inadequate appearance and performance.

The providing of a carbon-containing mold release film on the pressing surface of the pressing mold and the forming of a carbon-containing film on the surface of the glass material have a certain effect in preventing fusion. However, in such cases, it is desirable to conduct pressing in a nonoxidizing atmosphere to prevent oxidation of the carbon during press molding. However, the above readily reducible components tend to reduce even more readily in a nonoxidizing atmosphere, so there is a problem in that an interface reaction tends to occur between the glass and the carbon. Accordingly, a covering portion comprised of a second glass is provided in the present invention.

Examples of the first glass of the present invention are optical glasses containing essential components in the form of $B_2O_3$, $La_2O_3$, $Gd_2O_3$, and ZnO in addition to at least one readily reducible component selected from among W, Ti, Bi, and Nb.

In this optical glass, $B_2O_3$ is an essential component for the network structure of the glass. $La_2O_3$ and $Gd_2O_3$ are essential components for imparting a high refractive index and low dispersion characteristics, and by having the two present together, the stability of the glass is enhanced even more. ZnO is an essential component for imparting a low softening temperature to the glass without lowering the refractive index.

Optical characteristics in the form of a refractive index (nd) exceeding 1.7, desirably 1.8 or higher, and an Abbé number (v(nu)d) of less than 35, desirably 25 to less than 35, can be imparted by incorporating the above essential components into the optical glass. A specific example is as follows: an optical glass comprising, denoted as mol percentages: 0 to 40 percent of $SiO_2$, 4 to 50 percent of $B_2O_3$, 0 to 30 percent of $Li_2O$, 0 to 25 percent of $Na_2O$, 0 to 20 percent of $K_2O$, 1 to 40 percent of ZnO, 0 to 15 percent of CaO, 0 to 15 percent of BaO, 0 to 15 percent of SrO, 0 to 20 percent of MgO, 1 to 25 percent of $La_2O_3$, 1 to 20 percent of $Gd_2O_3$, 0 to 15 percent of $Y_2O_3$, 0 to 30 percent of $Nb_2O_3$, 0 to 20 percent of $WO_3$, 0 to 40 percent of $TiO_2$, and 0 to 20 percent of $Bi_2O_3$.

When this optical glass has a transition temperature Tg of 550° C. or higher, such as 550° C. or higher and 630° C. or lower, the effect of the present invention is pronounced.

The individual components of the above optical glass will be described.

$B_2O_3$ is an essential component for network formation. However, the refractive index (nd) drops when incorporated in excessive quantity, so 4 to 50 percent is incorporated. The quantity incorporated is desirably 18 to 43 percent, most preferably 20 to 40 percent.

$La_2O_3$ is an essential component for imparting a high refractive index and low dispersion characteristics. However, the stability of the glass drops when incorporated in excessive quantity, so 1 to 25 percent is incorporated. The quantity incorporated is desirably 6 to 19 percent, most preferably 7 to 18 percent.

$Gd_2O_3$ is an essential component for imparting a high refractive index and low dispersion characteristics. However, the stability of the glass drops when incorporated in excessive quantity, so 1 to 20 percent is incorporated. As already set forth above, the presence of $Gd_2O_3$ together with $La_2O_3$ has the effect of enhancing glass stability even more than when incorporated alone. The quantity incorporated is desirably 1 to 18 percent, most preferably 1 to 16 percent.

ZnO is an essential component for imparting low temperature softening properties while maintaining a high refractive index. However, the stability of the glass drops when incorporated in excessive quantity, so 1 to 40 percent is incorporated. The quantity incorporated is desirably 12 to 40 percent, most preferably 15 to 40 percent.

$WO_3$ functions to raise the refractive index and enhance the stability of the glass, thereby lowering the liquidus temperature. However, the stability of the glass drops and the glass develops color when incorporated in excessive quantity. Accordingly, the quantity of $WO_3$ incorporated is 0 to 20 percent, desirably 1 to 15 percent, and most preferably, 2 to 13 percent.

$Nb_2O_5$ is a component that raises the refractive index. However, when incorporated in excessive quantity, the glass stability decreases and the liquidus temperature rises. Thus, 0 to 30 percent of this component is incorporated. The quantity incorporated is desirably 0 to 8 percent, most preferably 0 to 7 percent.

$TiO_2$ is also a component that raises the refractive index. However, when incorporated in excessive quantity, the glass stability decreases and the glass develops coloration. Thus, 0 to 40 percent of this component is incorporated. The quantity incorporated is desirably 0 to 19 percent, most preferably 1 to 18 percent.

To raise the refractive index, the total quantity of $WO_3$, $Ta_2O_5$, $Nb_2O_5$, and $TiO_2$ desirably exceeds 10 weight percent, is preferably 11 weight percent or higher, and is most preferably 12 weight percent or higher.

$SiO_2$ functions to enhance glass stability. However, when incorporated in excessive quantity, the refractive index drops and the glass transition temperature rises. Accordingly, 0 to 40 percent of this component is incorporated. The quantity incorporated is desirably 0 to 15 percent, most preferably 1 to 10 percent.

To raise the refractive index even higher while still satisfying the various conditions required for obtaining a glass with an Abbé number (v(nu)d) of less than 35, the molar ratio of the quantity of $B_2O_3$ to the total quantity of $B_2O_3$ and $SiO_2$ ($B_2O_3/(B_2O_3+SiO_2)$) is desirably 0.80 to 1.00, most preferably 0.82 to 1.00.

$Li_2O$ has the effect of greatly lowering the glass transition temperature. However, when incorporated in excessive quantity, the refractive index drops and glass stability diminishes. Accordingly, the quantity of $Li_2O$ is desirably 0 to 30 percent. When priority is attached to imparting a low temperature softening property, this quantity is desirably 0.1 to 15 percent. When priority is attached to achieving a high refractive index, $Li_2O$ need not be incorporated. Thus, whether or not to incorporate $LI_2O$ can be determined based on the objective. $Na_2O$ and $K_2O$ function to enhance melt properties. However, when introduced in excessive quantity, the refractive index and glass stability drop. Thus, they are introduced in quantities of 0 to 25 percent and 0 to 20 percent, respectively. The quantities introduced are desirably 0 to 8 percent, most preferably 0 to 6 percent.

MgO, CaO, and SrO also function to enhance melt properties. However, when incorporated in excessive quantity, the refractive index and glass stability drop. Thus, MgO is introduced in a quantity of 0 to 20 percent, and CaO and SrO are introduced in quantities of 0 to 15 percent. The quantity of each compound introduced is desirably 0 to 8 percent, most preferably 0 to 6 percent. BaO functions to raise the refractive index, but decreases glass stability when introduced in excessive quantity. Thus, the quantity introduced is 0 to 15 percent. The quantity introduced is desirably 0 to 8 percent, most preferably 0 to 6 percent.

$Y_2O_3$ functions to impart a high refractive index and low dispersion characteristics. However, when introduced in excessive quantity, the glass stability drops. Thus, the quantity introduced is 0 to 15 percent. The quantity introduced is desirably 0 to 7 percent, most preferably 0 to 6 percent. Incorporating $Y_2O_3$ with $La_2O_3$ functions to enhance glass stability still further.

$ZrO_2$ functions to raise the refractive index. However, when incorporated in excessive quantity, the glass stability decreases and the liquidus temperature rises. Thus, 0 to 10 percent of this compound is incorporated. The quantity incorporated is desirably 0 to 9 percent, most preferably 0 to 8 percent.

The total quantity of $WO_3$, $Ta_2O_5$, $Nb_2O_5$, $TiO_2$, and $ZrO_2$ is desirably 2 to 40 mol percent, most preferably 5 to 35 mol percent, to raise the refractive index while maintaining glass stability.

$Bi_2O_3$ functions to raise the refractive index and enhance glass stability. However, when incorporated in excessive quantity, the glass develops coloration. Thus, 0 to 20 percent of this compound is incorporated. The quantity incorporated is desirably 0 to 8 percent, most preferably 0 to 5 percent.

The total quantity of the various above-described components together with the clarifying agent desirably exceeds 95 percent, preferably exceeds 98 percent, more preferably exceeds 99 percent, and most preferably, amounts to 100 percent to enhance the above-described properties while achieving the object of the present invention.

The total quantity of clarifying agent added in addition to the above-described components is 0 to 1 percent. However, the addition of an excessive quantity of clarifying agent requires caution in that it risks damaging the pressing surface of the pressing mold, particularly the mold release film, during precision press molding. Examples of clarifying agents are $Sb_2O_3$ and $As_2O_3$. However, the use of $As_2O_3$ is to be avoided due to environmental impact concerns. $Sb_2O_3$ is desirably added in a quantity of 0 to 1 percent.

Fluorine can also be incorporated. However, since it volatizes from the glass during molding of the glass melt, causing striae and variation in optical constants, it is desirably not incorporated.

Additionally, the introduction of PbO is to be avoided due to environmental impact and the fact that it reduces in a nonoxidizing atmosphere during precision press molding, adhering to the pressing surface of the pressing mold. Further, the incorporation of Cu, Fe, Cd, and the like is undesirable, unless to impart a light-absorbing function in a specific wavelength region to impart color to the glass.

The Second Glass

In the present invention, a covering portion is provided to inhibit undesirable reactions on the surface in the course of molding an optical element with a first glass having desired optical performance. Accordingly, the covering portion is comprised of a second glass having less reactivity with the pressing surface than the first glass and permitting continuous, stable press molding without the above-described problems.

The covering portion comprised of the above second glass is to be able to essentially cover the first glass, after the first glass as it is deformed and extended into a desired shape by the pressure exerted during pressing until press molding is completed. Thus, a glass material having physical characteristics identical to or approximating those of the core portion in a heated environment is suitable for use as the material of the covering portion.

In the present invention, it is appropriate to employ a multicomponent glass as the second glass, in the same manner as for the first glass. The multicomponent glass is not a compound comprised of a single bond between different atoms, such as in quartz glass, but a composite comprised of an accumulation of two or more bonds between different atoms, containing multiple cations and/or anions.

The cationic component of the multicomponent glass is not specifically limited. However, conventional metal elements such as alkali metals, alkaline earth metals, boron, and aluminum can be incorporated to the extent that the object of the present invention is not lost. Transition metal elements, excluding the above-described readily reducible components, can also be incorporated, to the extent that the object of the present invention is not lost, in applications of the first glass and combinations of the first and second glasses to optical elements. The anionic component of the multicomponent system is not specifically limited; oxygen, sulfur, fluorine, chlorine, and the like can be incorporated.

Specific examples of the second glass are given below. Readily reducible components comprised of W, Ti, Bi, and Nb are either not incorporated in the second glass, or are incorporated in smaller quantities than in the core portion. The other components are not limited, but as in the first glass, compounds such as $TeO_2$, PbO, $As_2O_3$, CdO, $Tl_2O$, radioactive substances, Cr, and Hg are desirably not employed for environmental impact reasons. Further, not incorporating an alkali metal into the second glass is desirable in that it increases the degree of freedom of the molding methods that can be applied in the coating step (film-forming step) described further below. It is also desirable not to incorporate fluorine.

Multicomponent glasses suitable for use as the second glass in the present invention are glasses containing glass formers in the form of $SiO_2$, $P_2O_5$, $B_2O_3$, $Al_2O_3$, $GeO_2$, and $Ga_2O_3$, for example. The glass may have a transition temperature Tg falling within the range of 270 to 700° C.

Examples of multicomponent glasses in which the content of readily reducible components is lower than that of the core portion are the glasses described in Embodiments 1 to 14 further below. These glasses share characteristics (1) to (3) below:
(1) a low content (5 mol percent or less) of oxides readily creating oxygen vacancies, such as $TiO_2$, $Nb_2O_5$, $WO_3$, and $Bi_2O_3$;
(2) a degree of abrasion of (FA)≤200; and
(3) no PbO content.

Further examples of multicomponent glasses in which the content of reducible components is lower than that in the core portion are the glasses of Embodiments 15 to 39 further below. These glasses share characteristics (1) and (2) below:
(1) a low content (5 mol percent or less) of oxides readily creating oxygen vacancies, such as $TiO_2$, $Nb_2O_5$, $WO_3$, and $Bi_2O_3$; and
(2) low acid resistance (undergoing etching more readily than the core glass):
containing an essential component in the form of phosphoric acid and/or boric acid with lower water resistance as a single substance;
containing an optional component in the form of an alkaline earth element and/or alkali element to adjust the glass transition temperature (Tg);

containing optional components in the form of $SiO_2$ and $Al_2O_3$ to adjust an excessively low acid resistance and enhance the thermal stability of the glass; and/or containing optional components in the form of oxides that do not readily create oxygen vacancies, such as $La_2O_3$, $Y_2O_3$, $Sc_2O_3$, $Gd_2O_3$, $Lu_2O_3$, $ZrO_2$, and $HfO_2$.

The glasses of Embodiments 15 to 39 below given by way of example can be classified as set forth below:

TABLE 1

| Category | Embodiment | Common characteristics |
|---|---|---|
| Group A | 15-19 | Phosphate glasses of various phosphate-boron ratios. |
| Group B-1 | 20-24 28-31 | Readily acid-soluble B—Si—Ba glasses of various $B_2O_3$—$SiO_2$ quantities. |
| Group B-2 | 25-27 | B—Si—Ba glasses into which various alkali components (Li, Na, K) are introduced based on a basic glass composition (Embodiment 32). |
| Group B-3 | 32-36 | B—Si—Ba glasses into which various alkaline earth components (Mg, Ca, Sr, Zn) are introduced based on a basic glass composition (Embodiment 32). |
| Group C | 37-39 | Glasses of various Tg and with greater acid resistance than Groups A and B. |

[Glass Materials for Mold Pressing of Fluorine Glasses]

The present invention includes a glass material for mold pressing, comprised of a core portion comprising a fluorine-containing multicomponent optical glass (the third glass) and a covering portion covering the surface of said core portion, comprised of a multicomponent glass (the fourth glass) that does not contain fluorine.

The Third Glass

The third glass employed in the present invention is desirably a fluorophosphate glass desirably comprising, as an anion percentage, for example, 0.25 mol percent or more of $F^-$, preferably a fluorophosphate glass in which the molar ratio of $F^-$ to the total $F^-$ and $O^{2-}$ content ($F^-/F^- + O^{2-}$)) is 0.25 to 0.95.

By way of example, the fluorophosphate glass can be an optical glass comprising the following components, expressed as cation mol percentages: 10 to 45 percent of $P^{5+}$, 5 to 30 percent of $Al^{3+}$, 0 to 5 percent of $Y^{5+}$, 0 to 5 percent of $La^{5+}$, 0 to 5 percent of $Gd^{5+}$, 0 to 20 percent of $Mg^{2+}$, 0 to 25 percent of $Ca^{2+}$, 0 to 30 percent of $Sr^{2+}$, 0 to 30 percent of $Ba^{2+}$, 0 to 20 percent of $Zn^{2+}$, 0 to 30 percent of $Li^+$, 0 to 15 percent of $Na^+$, 0 to 15 percent of $K^+$, 0 to 10 percent of $B^{5+}$, and an $F^-/(F^- + O^{2-})$ ratio 0.25 to 0.95.

The above fluorophosphate glass desirably has a refractive index ranging from 1.4 to 1.6 and a ν(nu)d of 67 or higher; the ν(nu)d preferably ranges from 67 to 97.

The significance of each component is as set forth below. Cations and anions are given as percentages based on molar ratios.

$P^{5+}$ is an important cationic component as a network former. When too little is present, the stability of the glass decreases, and when too much is present, the oxygen in the starting material oxide reaches an excessively high ratio overall, making it impossible to achieve the targeted optical characteristics. A quantity of 10 to 45 percent is preferred.

$Al^{3+}$, when added in small quantity, enhances the stability of fluorophosphate glasses. However, in excessively large quantity, the glass transition temperature (Tg) rises. Thus, the temperature rises in the course of preforming the glass material from a molten state, and striae tend to form due to surface volatization of the glass material. A content of 5 to 30 percent is preferred.

Divalent cationic components ($R^{2+}$) in the form of $Mg^{2+}$, $Ca^{2+}$, $Sr^{2+}$, and $Ba^{2+}$ are suitably incorporated to enhance the stability of the glass. The quantity of $Mg^{2+}$, $Ca^{2+}$, $Sr^{2+}$, and $Ba^{2+}$ desirably fall within the following ranges.

The $Mg^{2+}$ content is desirably 0 to 20 percent, preferably 1 to 20 percent, more preferably 5 to 15 percent, and most preferably, 5 to 10 percent.

The $Ca^{2+}$ content is desirably 0 to 25 percent, preferably 1 to 25 percent, more preferably 5 to 20 percent, and most preferably, 5 to 16 percent.

The $Sr^{2+}$ content is desirably 0 to 30 percent, preferably 1 to 30 percent, more preferably 5 to 25 percent, and most preferably, 10 to 20 percent.

The $Ba^{2+}$ content is desirably 0 to 30 percent, preferably 1 to 30 percent, more preferably 1 to 25 percent, most preferably 5 to 25 percent, and even more preferably, 8 to 25 percent.

Two or more from among $Mg^{2+}$, $Ca^{2+}$, $Sr^{2+}$, and $Ba^{2+}$ are desirably incorporated. Two or more from among $Ca^{2+}$, $Sr^{2+}$, and $Ba^{2+}$ are preferably incorporated. To further enhance the effect achieved by introducing a divalent cationic component ($R^{2+}$), the total content of $Mg^{2+}$, $Ca^{2+}$, $Sr^{2+}$, and $Ba^{2+}$ is desirably 1 cation percent or greater.

$Li^+$ is a component that lowers the glass transition temperature (Tg) without compromising stability. At 30 percent or lower, glass durability and processability are not lost. A range of 2 to 30 percent is desirable, 5 to 25 percent is preferred, and 5 to 20 percent is of even greater preference.

$Na^+$ and $K^+$ have the same effect of lowering the glass transition temperature (Tg) as $Li^+$, but they tend to increase the coefficient of thermal expansion more than $Li^+$ NaF and KF are much more soluble in water than LiF, and thus cause deterioration of water resistance. Thus, the desirable range for both $Na^+$ and $K^+$ is 0 to 15 percent, and no incorporation is preferred.

$Y^{3+}$, $La^{3+}$, and $Gd^{3+}$ have the effects of enhancing glass stability and durability and raising the refractive index. However, at quantities of greater than 5 percent, there is a risk that stability will deteriorate and the glass transition temperature (Tg) rises. Thus, the quantity is set at 0 to 5 percent, desirably ranging from 0 to 3 percent.

To stably manufacture high-quality optical glass, the total quantity of $P^{5+}$, $Al^{3+}$, $Mg^{2+}$, $Ca^{2+}$, $Sr^{2+}$, $Ba^{2+}$, $Li^+$, $Y^{3+}$, $La^{3+}$, and $Gd^{3+}$ as a cation percentage desirably exceeds 95 percent, preferably exceeds 98 percent, more preferably exceeds 99 percent, and still more preferably, is 100 percent.

To the extent that the object of the present invention is not lost, the optical glass may contain cationic components such as lanthanoids such as Ti, Zr, and Zn, and cationic components such as B, in addition to the above-described cationic components.

To obtain an optical glass having good stability while achieving desired optical characteristics, the proportion of anionic components is suitably such that the molar ratio of the content of $F^-$ to the total quantity of $F^-$ and $O^{2-}$ ($F^-/(F^- + O^{2-})$) is 0.25 to 0.95.

The Fourth Glass

In the present invention, a covering portion is provided to inhibit undesirable reactions on the surface in the course of molding an optical element based on a third glass having desired optical performance. Accordingly, the covering portion is a fourth glass having a lower reactivity with the pressing surface than the third glass, permitting continuous, stable press molding without the above-described problems.

The covering portion comprised of the fourth glass is to be able to essentially cover the third glass, after the third glass as it is deformed and extended into a desired shape by the pressure exerted during pressing until press molding is completed. Thus, a glass material having physical characteristics identical to or approximating those of the core portion in a heated environment is suitable for use as the material of the covering portion.

In the present invention, it is appropriate to employ a multicomponent glass as the fourth glass, in the same manner as for the third glass. The multicomponent glass is not a compound comprised of a single bond between different atoms, such as in quartz glass, but a composite comprised of an accumulation of two or more bonds between different atoms, containing multiple cations and/or anions.

The cationic component of the multicomponent glass is not specifically limited. However, conventional metal elements such as alkali metals, alkaline earth metals, boron, and aluminum can be incorporated to the extent that the object of the present invention is not lost. Transition metal elements, excluding the above-described readily reducible components, can also be incorporated, to the extent that the object of the present invention is not lost, in applications of the third glass and combinations of the third and fourth glasses to optical elements. The anionic component of the multicomponent system is not specifically limited; oxygen, fluorine, chlorine, and the like can be incorporated.

Specific examples of the fourth glass are given below.

The fourth glass contains no fluorine or less fluorine than the core portion. The other components are not limited, but for the same reasons as for the first glass, compounds such as $TeO_2$, $PbO$, $As_2O_3$, $CdO$, $Tl_2O$, radioactive substances, Cr, and Hg are desirably not employed due to their environmental impact. Further, not incorporating an alkali metal into the fourth glass is desirable in that it increases the degree of freedom of the molding methods that can be applied in the coating step (film-forming step) described further below.

Multicomponent glasses suitable for use as the fourth glass in the present invention are glasses containing glass formers in the form of $SiO_2$, $P_2O_5$, $B_2O_3$, $Al_2O_3$, $GeO_2$, and $Ga_2O_3$, for example. The glass may have a transition temperature Tg falling within the range of 270 to 700° C.

Examples of the fourth glass are the specific examples of the second glass set forth above and the glasses described in Embodiments 1 to 14 further below.

The second or fourth glass desirably satisfies the relation of one of equations (1) to (8) below with the first or third glass when the glass transition points Tg of the first, second, third, and fourth glasses are denoted as Tg1, Tg2, Tg3, and Tg4, respectively, and the sag temperatures Ts of the first, second, third, and fourth glasses are denoted as Ts1, Ts2, Ts3, and Ts4, respectively:

$(A)\ Tg1 < Tg2 < Ts1$      Equation (1)

or $Tg3 < Tg4 < Ts3$ (2)      Equation (2)

or $(B)\ Tg2 \le Tg1 \le Ts2$      Equation (3)

or $Tg4 \le Tg3 \le Ts4$      Equation (4)

is satisfied.

Further, $Tg1-20°\ C. < Tg2 < Tg1+20°\ C.$      Equation (5)

or $Tg3-20°\ C. < Tg4 < Tg3+20°\ C.$      Equation (6)

is satisfied.

Further, $(Tg1+20°\ C.) \le Tg2 \le 800°\ C.$      Equation (7)

or $(Tg3+20°\ C.) \le Tg4 \le 800°\ C.$      Equation (8)

is satisfied.

Selecting a glass that satisfies the relation of equation (1) or (2) above is advantageous in that when the first or third glass (core portion) is deformed by press molding, the second or fourth glass (covering portion) will exhibit a higher viscosity and lower reactivity than the core portion, thereby causing undesirable reactions between the pressing surface and the interface tend not to occur. For example, when Tg1 and Tg3 of the first and third glasses (core portions) are 470° C. and Tg2 and Tg4 of the second and fourth glasses (cover portions) are 500° C., the cover portion becomes somewhat harder under identical temperature conditions, affording the above-stated advantage.

Selecting a glass that satisfies the relation of equation (3) or (4) above causes the second or fourth glass (covering portion) to exhibit a viscosity of a degree capable of following the deformation in shape of the first glass and a viscosity capable of maintaining the deformed shape when the first or third glass (core portion) is deformed by press molding. This is effective when the second or fourth glass is a glass with little reactivity with the interface, or when the reactivity with the pressing surface of the pressing mold is low. Further, when the amount of deformation of the core portion glass is great, or when the covering portion glass is to be greatly extended because the surface area of a molded product to be obtained is bigger than surface area of a glass material, it is advantageous for the covering portion glass to keep the first or third glass in a covered state without breaking. There are cases of great expansion of surface area, such as when molding an optical element having a concave surface from a glass material in the form of a sphere or having a biconvex surface shape obtained by flattening a sphere, or such as when molding an optical element having a flange-shaped flattened portion along the perimeter thereof from a similar glass material. For example, when Tg1 or Tg3 of the first or third glass (core portion) is 470° C. and Tg2 or Tg4 of the second or fourth glass (covered portion) is 440° C., the covered portion will be somewhat softer under identical temperature conditions, affording the above-stated advantages.

When a combination of first and second, or third and fourth, glasses is selected to satisfy the relation of equation (5) or (6) above, and the core portion glass is press molded and then subjected to a cooling step, the covering portion glass will also be at a temperature suited to deformation in response to deformation and shrinkage of the core portion glass. Accordingly, this is advantageous in that the covering portion glass will not break or run due to deformation of the core portion glass, but will be able to undergo deformation following the deformation of the first glass while keeping the first glass in a covered state. For example, when the difference between Tg1 or Tg3 of the first or third glass (core portion) and Tg2 or Tg4 of the second or fourth glass (covering portion) is 20° C. or less, the hardness of the core portion and covering portion will be equivalent, affording the above-stated advantage.

When a combination of first and second, or third and fourth, glasses is selected to satisfy the relation of equation (7) or (8) above, since pressing is conducted at a temperature at which the second and fourth glasses are quite hard, there is an inhibiting effect on interface reactions between the core glass and the second and fourth glasses. Thus, an inhibiting effect on reactions between the mold and the second and fourth glasses is also achieved, affording the advantage of extending the service lifetime of the mold. For example, when Tg1 or Tg3 of the first or third glass (core portion) is 470° C. and Tg2 or Tg4 of the second or fourth glass (covering portion) is 490 to 800° C., the covering portion will be much harder under identical temperature conditions, affording the above-stated advantage.

When glasses are selected so that the glass transition temperatures Tg of the first, second, third, and fourth glasses, denoted as Tg1, Tg2, Tg3, and Tg4, respectively; when the sag temperatures of the first and third glasses, denoted as Ts1 and Ts3, respectively; and when the specified temperatures at which the first and third glasses exhibit a viscosity of $1/1,000$ or more the viscosity exhibited at the softening point of the respective glasses (viscosity=$10^{7.6}$ dPa.s), denoted as T1 (where T1>Ts1) and T3 (wherein T3>Ts3), respectively, satisfy the following relation:

Ts1<Tg2<T1 or

Ts3<Tg4<T3, then an inhibiting effect on reactions at the interface of the core glass with the second and fourth glasses is achieved because pressing is conducted under conditions at which the second and fourth glasses are quite hard. Thus, an inhibiting effect on reactions between the second and fourth glasses and the mold is also achieved, which is desirable in that it extends the service lifetime of the mold.

At such times, T1 and T3 are desirably temperatures at which the first and third glasses exhibit viscosities (viscosity=$10^{4.6}$ dPa.s) of $1/1,000$ their softening points, preferably temperatures at which the first and third glasses exhibit viscosities (viscosity=$10^{5.6}$ dPa.s) of $1/100$ their softening points, more preferably temperatures at which the first and third glasses exhibit viscosities of $1/10$ (viscosity=$10^{6.6}$ dPa.s) their softening points, and still more preferably, temperatures which are softening points of the first and third glasses (viscosity=$10^{7.6}$ dPa.s).

When glasses are selected so that the glass transition temperatures Tg of the first, second, third, and fourth glasses, denoted as Tg1, Tg2, Tg3, and Tg4, respectively; when the sag temperatures Is of the second and fourth glasses, denoted as Ts2 and Ts4, respectively; and when the temperatures at which the second and fourth glasses exhibit a viscosity of $1/1,000$ or more the viscosity exhibited at the softening point of the respective glasses (viscosity=$10^{7.6}$ dPa.s), denoted as T2 (where T2>Ts2) and T4 (where T4>Ts4), respectively, satisfy the following relation:

Ts2<Tg1<T2 or

Ts4<Tg3<T4, then the temperature will be suitable for deformation of both the covering portion glass and the core glass as well as deformation due to contraction during press molding of the glass core portion and the subsequent cooling step. Accordingly, deformation of the core portion does not cause breakage or flowing of the covering portion glass, which is advantageous from the perspective of permitting deformation that follows deformation of the first glass while keeping the first glass in a covered state.

At such times, T2 and T4 are desirably temperatures at which the second and fourth glasses exhibit viscosities (viscosity=$10^{5.6}$ dPa.s) of $1/100$ their softening points, preferably temperatures at which the second and fourth glasses exhibit viscosities (viscosity=$10^{6.6}$ dPa.s) of $1/10$ their softening points, and more preferably, temperatures which are softening points of the second and fourth glasses (viscosity=$10^{7.6}$ dPa.s).

For example, when press molding a glass material in which the covering portion is markedly softer under identical temperature conditions, such as a glass material in which a first glass having a Tg1 of 600° C. is covered with a second glass having a Ts2 of 550° C., or a glass material in which a third glass having a Tg3 of 470° C. is covered with a fourth glass having a Ts4 of 440° C., the covering portion deforms following deformation of the core portion, resulting in good press molding.

Glasses are desirably selected so that the average coefficient of linear expansion at 100 to 300° C. of the first, second, third, and fourth glasses, denoted as α(alpha)h1, α(alpha)h2, α(alpha)h3, and α(alpha)h4, satisfy the following relations:

$$\alpha(alpha)h2 \times 0.8 \leq \alpha(alpha)h1 \leq \alpha(alpha)h2 \times 1.2 \quad \text{Equation (9)}$$

$$\alpha(alpha)h4 \times 0.8 \leq \alpha(alpha)h3 \leq \alpha(alpha)h4 \times 1.2 \quad \text{Equation (10)}.$$

Thus, even when the volume shrinks due to a drop in temperature in the cooling step after press molding, close contact is well maintained at the interface between the first and second glasses and breaks and dissociation tend not to occur in the covering of the second glass. Glasses are preferably selected that satisfy:

$$\alpha(alpha)h2 \times 0.9 \leq \alpha(alpha)h1 \leq \alpha(alpha)h2 \times 1.1 \quad \text{Equation (11)}$$

$$\alpha(alpha)h4 \times 0.8 \leq \alpha(alpha)h3 \leq \alpha(alpha)h4 \times 1.2 \quad \text{Equation (12)}.$$

The glass that is the material of the above second glass (second glass material) need not be of the same composition as the second glass covering the surface of the first glass.

It suffices for the second glass covering and the first glass to satisfy the relation shown in equations (1) to (8) above. This also holds true for the third and fourth glasses.

Preferably, film forming conditions are selected so that both the first glass in a covered state and the second glass material satisfy the above conditions. Then, for example, when both a highly volatile component (such as an alkali metal) and a component of low volatility are being incorporated into the second glass, it is desirable to select a film forming method capable of yielding almost equivalent physical properties (glass transition temperature, average coefficient of linear expansion) in both the first glass material and covered second glass. For example, sputtering can be suitably employed.

As will be described further below, the covering portion can be removed from the molded product or left in place as is after press molding of the glass material of the present invention. When the covering portion is removed after press molding, glasses having a weight reduction rate of 10-fold or greater that of the first and third glasses in a prescribed acid or alkali treatment can be employed as the second and fourth glass materials.

The prescribed acid or alkali treatment step can be performed, for example, in the order of etching, rinsing, and drying.

For example, a molded product obtained by press molding can be set in a jig or the like, immersed for a prescribed period (10 to 300 seconds, for example) in a vessel containing etching solution, and once the covering portion has been removed, immersed in a vessel containing water to remove the etching solution from the surface of the molded product. The water can then be removed from the surface of the molded product in a drier to obtain a dried molded product. Following any of these steps, a cleaning step can be used to increase the cleanliness of the surface of the molded product. However, from the perspective of increasing the cleanliness of the surface of the molded product, the molded product is desirably subjected to a lens cleaning step prior to the drying step.

Neither the type nor concentration of the etching solution is specifically limited. Nitric acid, hydrochloric acid, sulfuric acid, a mixture of two or more of the same, an aqueous solution of sodium hydroxide or potassium hydroxide, or the like can be suitably diluted for use as a 0.0001 N to 1 N aqueous solution, or a commercial mixed acid, mixed alkali, cleaning solution, or the like can be employed based on the objective.

The etching step is desirably conducted after subjecting the molded product obtained by press molding to an annealing and/or centering and edging step.

When removing the covering portion after press molding, a glass of much lower chemical resistance, such as acid resistance or alkali resistance, than the first glass can be employed as the second glass. This is desirable to increase the ratio of etching rates of the first and second glasses during chemical treatment (acid, alkali treatment or the like). Denoting the etching rate of the first glass as R1, the etching rate of the second glass as R2, and the ratio of R2/R1 as Re, logRe is 2 or greater, desirably 2.5 or greater, preferably 3 or greater, more preferably 3.5 or greater, still more preferably 4 or greater, even more preferably 4.5 or greater, yet more preferably 5 or greater, and even yet more preferably, 6 or greater. It is particularly desirable for R1=0.

It is desirable for D1>D2, where D1 denotes the etching rate of the glass film material (second glass) and D2 denotes the etching rate of the glass core material (first glass). It is also desirable for D1=0.01 to 0.50, and D2=0.000 to 0.05. Preferably, D1>10×D2.

The same distinction is made for the film material and core material with regard to the difference in etching rates for the third and fourth glasses. That is, it is desirable for D3>D4 (with D3=0.01 to 0.50 and D4=0.000 to 0.05), where D3 denotes the etching rate of the glass core material (third glass) and D4 denotes the etching rate of the glass film material (fourth glass).

Glass etching rates D1, D2, D3, and D4 are defined based on the average weight reduction rate (weight percent/minute) per unit of time during immersion for a prescribed period in an acid or alkali solution of prescribed concentration.

The shape of the material employed in the present invention is not specified in any manner in the description given below. For example, when calculating the average weight reduction rate per unit time in the present invention, a glass block having a surface area of 100 to 1,000 mm$^2$ and a volume of 100 to 1,000 mm$^3$ comprised of the same composition as the film material is immersed in 0.1 N HNO$_3$ at 50° C. and the weight reduction rate per minute when the immersion period is varied is calculated as: (weight of glass prior to immersion−weight of glass after immersion)/(weight of glass prior to immersion)/immersion time (minutes)×100(%). The average weight reduction rate D(t) (t=10, 15, 20, 25) for an immersion time t (minutes) is calculated as the average weight reduction rate per unit of time at immersion times of 10 to 25 minutes.

The etching rate obtained by the above method varies with the surface area of the sample. However, the following procedure is used to calculate the etching rate per unit area, permitting comparison of etching rates calculated for samples of differing surface area.

First, for the specific gravity of the glass after etching, the specific gravity of the glass before and after etching is deemed to be approximately identical when the etching time is short—from several minutes to several tens of minutes. Thus, the volume reduction rate per unit time (volume percent/minute) of the glass due to etching matches the volume reduction rate per unit time (weight percent/minute).

Next, since the glass etching reaction is a chemical reaction between a solid phase and a liquid phase in the form of the glass solid and etching solvent, the etching rate is almost proportional to the surface area of the sample. When the solvent is adequately stirred and the etching rate does not extremely large, diffusion of the solvent is deemed not to control the rate of the reaction. Thus, the glass surface masking effect of the jig, net, or the like holding the glass can be ignored, and the glass surface is deemed to be etched away in approximately uniform fashion. Thus, the glass etching rate is almost proportional to the surface area of the glass sample.

Thus, the etching rate calculated as the average weight reduction rate per unit time can be converted to a volume reduction rate per unit time per unit surface area, or the rate of reduction of thickness of the glass per unit time (the units being micrometers/minute or the like).

Specifically, denoting the weight reduction rate per unit time (weight percent/minute) as Dw, the volume reduction rate per unit time (weight percent/minute) as Dv, the surface area (mm$^2$) as S, the volume (mm$^3$) as V, and the glass thickness reduction rate per unit time (micrometers/minute) as Dt gives:

$$Dt=Dw/100\times V/S\times 1000=Dv/100\times V/S\times 1000.$$

Based on this equation, glass etching rates can be compared even when the surface area of the sample varies due to differences in the size and shape of the sample.

The thickness reduction rate per unit time Dt can be obtained by measuring the difference in glass thickness before and after etching with a commercial film thickness measuring apparatus, microscope, or the like. Specifically, the height of the step produced between masked portions and unmasked portions can be determined with an apparatus for measuring minute differences in level, a three-dimensional shape measuring apparatus, an atomic force microscope, or the like.

The absolute value of the etching rate of the second glass is desirably high to shorten the etching time. For example, the weight reduction rate of the second glass when immersed in 0.1N HNO$_3$ at 50° C. is desirably 0.01 percent/minute or greater, preferably 0.02 percent/minute or greater, more preferably 0.04 percent/minute or greater, still more preferably 0.08 percent/minute or greater, even more preferably 0.10 percent/minute or greater, and most preferably, 0.12 percent/minute.

The acid or alkali employed in etching is not specifically limited. Nor is the type or concentration of the etching solution specifically limited. Nitric acid, hydrochloric acid, sulfuric acid, acetic acid, phosphoric acid, an aqueous solution of sodium hydroxide or potassium hydroxide, or the like can be suitably diluted for use as a 0.1 N to 0.0001 N aqueous solution, or a commercial mixed acid, mixed alkali, cleaning solution, or the like can be employed based on the objective. In this process, the concentration is desirably adjusted to a degree that does not etch the first glass. Nitric acid, hydrochloric acid, sodium hydroxide; and the like, which do not cause salts to precipitate out due to the reaction with glass components, are particularly desirable. Buffer solutions, chelating agents, and the like can be added to the etching solution to the extent that the object of the present invention is not lost.

Preforming of the glass material of the present invention will be described. The glass material of the present invention can be produced using the first glass that has been preformed to prescribed volume and shape. In this preforming, for example, a piece is cut from a block of optical glass and the piece is ground and polished to preform it to prescribed volume and shape (preforming I). Further, a glass melt can be dripped from a pipe or separated while flowing to obtain glass gobs of prescribed weight, and the glass gobs can be preformed while cooling (preforming II). Here, the method employed can be one where the glass melt is received in a receiving mold through the bottom of which gas is being blown, and the glass gob preformed while being cooled while essentially floating. This method is desirable due to high productivity and the fact that it yields a glass material with a smooth surface. In method II, after preforming while cooling the glass gob as set forth above, mechanical processing such as polishing can be added to microadjust the shape and volume; such methods can also be suitably applied to the present invention.

The preform comprised of the first glass that has been preformed as set forth above is then coated with the second glass. A known film forming method such as sputtering or vacuum deposition can be employed as the coating method. For example, the second glass can be employed as target and a coating layer can be formed of the second glass by sputtering using argon gas.

When the film is excessively thick, as the core portion glass deforms and extends during press molding of the glass material, the covering portion cannot follow and cracking tends to occur. When the film is too thin, a portion of the surface of the glass material is exposed, which tends to react with the pressing mold. The thickness range of the film is desirably 0.1 to 1,000 nm, preferably 0.1 to 500 nm, and most preferably, 2 to 100 nm. It is desirable for the covering portion to completely cover the core portion.

A carbon-containing film is desirably present on the surface (beyond the covering portion) of the glass material of the present invention. Such a film imparts an adequate sliding property against the pressing mold while the glass material is being fed into the pressing mold prior to pressing, allowing the glass material to slide to a prescribed position (center position) within the pressing mold, and extending on the surface of the glass material as the glass deforms to facilitate spreading of the glass material along the surface of the pressing mold. It is also useful to facilitate mold release so that when the molded product has been cooled to a prescribed temperature after pressing, the glass separates readily from the surface of the pressing mold.

The carbon-containing film desirably comprises carbon as its principal component, and may be a film that contains components other than carbon, such as a hydrocarbon film. The film can be formed from a carbon starting material by a known film-forming method such as vacuum deposition, sputtering, ion plating, plasma treatment, or ion gun treatment. The film can also be formed by thermal decomposition of a carbon-containing compound such as hydrocarbon.

In the case of thermal decomposition of hydrocarbon, a glass gob that has been provided with a covering portion is received in a reaction vessel and brought into contact with hydrocarbon gas by introducing the same. The hydrocarbon is thermally decomposed to form a carbon film on the surface of the glass material. The hydrocarbon employed can be acetylene, ethylene, butane, ethane, propyne, propane, benzene, or the like. Acetylene is desirable from the perspective of having a relatively low thermal decomposition temperature. It is desirable for the temperature within the reaction vessel to have been raised to the thermal decomposition temperature by the time the hydrocarbon is introduced. The temperature range is suited to thermal decomposition of the hydrocarbon, and is normally 250 to 600° C. For example, when the hydrocarbon is acetylene, the temperature range is 400 to 550° C., desirably 480 to 510° C. The film is suitably 1 to 20 nm, desirably 1 to 10 nm, and preferably 2 to 5 nm, in thickness.

The present invention includes a method for manufacturing an optical glass element by heat softening a glass material that has been preformed to a prescribed shape and conducting press molding with a pressing mold. The above-described glass material of the present invention is employed in the method for manufacturing an optical glass element.

The press molding method will be described. A pressing mold having adequate thermal resistance and rigidity made of a dense material that has been precisely processed can be employed in press molding. Examples are pressing molds of silicon carbide, silicon nitride, tungsten carbide, aluminum oxide, titanium carbide, and metals such as stainless steel; as well as such pressing molds the surfaces of which have been coated with films of carbon, heat-resistant metals, noble metal alloys, carbides, nitrides, or borides.

The film coating the pressing surface desirably contains carbon. A carbon-containing film comprised of a single component layer or mixed layer of amorphous or crystalline graphite and/or diamond is desirably employed. The carbon film can be formed by means such as sputtering, plasma CVD, CVD, or ion plating. For example, the film can be formed by sputtering, employing an inert gas such as Ar as the sputtering gas and graphite as the sputtering target. Alternatively, microwave plasma CVD can be used to form a film employing methane gas and hydrogen gas as starting material gases. When forming the film by ion plating, ionization can be conducted with benzene gas. These carbon films include films having C—H bonds.

Press molding can be conducted by the following method, for example.

In press molding, a pressing mold (including an upper mold, lower mold, and sleeve mold) and a glass material are heated to within a temperature range suited to pressing. For example, press molding is desirably conducted with the glass material and pressing mold in a temperature range at which the viscosity of the glass material is $10^5$ to $10^{10}$ dPa.s. The pressing temperature is desirably a temperature at which the first or third glass exhibits a viscosity of about $10^{7.2}$ dPa.s. Accordingly, having a temperature at which the first or third glass exhibits a viscosity of about $10^{7.2}$ dPa.s of 800° C. or lower, desirably 750° C. or lower, preferably 650° C. or lower, becomes an indicator for selecting the glass. Tg1 and Tg3 (transition temperatures) are desirably 520° C. or lower. This is to permit press molding at a pressing temperature that is not excessively high. The first glass is of relatively high reactivity, so that when press molding is conducted at an excessively high temperature, there is a possibility that problems such as bubbling will occur. The glass material can be introduced into the pressing mold and both the glass material and pressing mold heated to within the above-stated temperature range, or the glass material and pressing mold can be separately heated to within the above-stated temperature range prior to positioning the glass material within the pressing mold. Further, a step can be employed in which the glass material is heated to a temperature corresponding to a viscosity of $10^5$ to $10^9$ dPa.s, the pressing mold is separately heated to a temperature corresponding to a glass viscosity of $10^9$ to $10^{12}$ dPa.s, the glass material is positioned within the pressing mold, and press molding is immediately conducted. In that case, since the temperature of the pressing mold can be kept relatively low, desirable effects are achieved in that the heating/cooling cycle of the molding machine can be shortened and deterioration due to heating of the pressing mold can be inhibited. In either case, cooling begins when press molding begins, or after it has begun. While applying a suitable load schedule and maintaining tight contact between the pressing surface and the glass element, the temperature is lowered. Subsequently, the mold is released and the molded product is removed. The mold release temperature desirably corresponds to a viscosity of $10^{12.5}$ to $10^{13.5}$.

The carbon-containing film can be removed from the surface of the molded product obtained by press molding. Further, the molded product can be annealed to remove strain and/or adjust the refractive index as needed. When that is done, the carbon-containing film can be removed by heating in an oxidizing atmosphere.

The covering portion of the present invention can be removed from the surface of the molded product as needed. Either a physical or chemical method of removal can be employed. A method based on abrasive cloth can be employed for physical removal. Etching can be employed as a chemical removal method. To remove the coating film by etching, as set forth above, it is desirable to select a second glass having a higher etching rate by acids or alkalis than the first glass. Similarly, it is desirable to select a fourth glass having a higher etching rate by acids or alkalis than the third glass.

The etching step can be conducted in the order of, for example, etching, rinsing, and drying in the same manner as described for the prescribed acid or alkali treatment step.

For example, a molded product obtained by press molding can be set in a jig or the like, immersed for a prescribed period (10 to 300 seconds, for example) in a vessel containing etching solution, and once the covering portion has been removed, immersed in a vessel containing water to remove the etching solution from the surface of the molded product. The water can then be removed from the surface of the molded product in a drier to obtain a dried molded product. Following any of these steps, a cleaning step can be used to increase the cleanliness of the surface of the molded product. However, from the perspective of increasing the cleanliness of the surface of the molded product, the molded product is desirably subjected to a lens cleaning step prior to the drying step.

Neither the type nor concentration of the etching solution is specifically limited. Nitric acid, hydrochloric acid, sulfuric acid, a mixture of two or more of the same, an aqueous solution of sodium hydroxide or potassium hydroxide, or the like can be suitably diluted for use as a 0.0001 N to 1 N aqueous solution, or a commercial mixed acid, mixed alkali, cleaning solution, or the like can be employed based on the objective.

The etching step is desirably conducted after subjecting the molded product obtained by press molding to an annealing and/or centering and edging step.

When not removing the covering portion from the surface of the molded product in the present invention, the covering portion can be employed as an optically functional film of an optical element, or as a portion thereof. One optically functional film for which it can be employed is an antireflective film. In that case, a single-layer or multiple-layer film of a known material can be suitably formed on the molded product having a covering portion to obtain a desired antireflective film.

The optical element of the present invention can be employed as a small diameter, thin, lightweight lens, such as the small image pickup lenses mounted in portable image pickup apparatuses and the like; communication lens; optical pickup object lens; collimator lens; or the like.

[Embodiments]

The present invention is described in greater detail below through embodiments.

Embodiments 1 to 39

A convex meniscus glass lens 16 mm in diameter was molded from optical glass A (composition: 28 mol percent total quantity of network-forming components in the form of $P_2O_5$ and $B_2O_3$; 43.5 mol percent total quantity of readily reducible components ($TiO_2+P_2O_5+Bi_2O_3+WO_3$), of which 8 mol percent was W and the remainder were modifying components; T1 ($10^{7.2}$ dPa.s)=572° C.; Tg1=471° C.; Ts1=528° C.; (v(nu)d1=21); α(alpha)h1=108).

First, a melt of optical glass A was dripped into a receiving mold and cooled to preform biconvex round surface glass pieces in the form of depressed spheres. Next, a glass B in the form of the various multicomponent glasses shown in Table 2 (soft glass-use glass coating materials) and Table 3 (film materials of low reducibility and low acid resistance) was employed as the target and sputtering was used to form a covering portion 13 nm in thickness on the surface of the above preformed glass pieces, yielding the glass materials for mold pressing of Embodiments 1 to 39, each of which was comprised of a core portion having a surface covered with a covering portion.

TABLE 2

| | | $B_2O_3$ | $SiO_2$ | $Al_2O_3$ | $Li_2O$ | $Na_2O$ | $K_2O$ | MgO | CaO | SrO | BaO | ZnO |
|---|---|---|---|---|---|---|---|---|---|---|---|---|
| Embodiment 1 | mol % | 56.1 | 8.7 | 0.5 | 0.0 | 0.0 | 0.0 | 0.0 | 20.3 | 0.0 | 0.0 | 0.0 |
| Embodiment 2 | mol % | 41.0 | 26.0 | 1.3 | 0.0 | 0.0 | 0.0 | 0.0 | 0.0 | 0.0 | 25.2 | 0.0 |
| Embodiment 3 | mol % | 18.3 | 55.1 | 4.2 | 0.0 | 0.0 | 0.0 | 0.0 | 0.0 | 0.0 | 22.4 | 0.0 |
| Embodiment 4 | mol % | 23.4 | 46.6 | 1.2 | 0.0 | 0.0 | 0.0 | 0.0 | 0.0 | 0.0 | 28.8 | 0.0 |
| Embodiment 5 | mol % | 19.5 | 45.3 | 0.9 | 0.0 | 0.0 | 0.0 | 0.0 | 1.6 | 0.0 | 28.9 | 2.0 |
| Embodiment 6 | mol % | 8.6 | 53.1 | 2.2 | 23.2 | 0.0 | 1.1 | 0.0 | 0.0 | 0.0 | 8.1 | 3.2 |
| Embodiment 7 | mol % | 9.4 | 74.4 | 0.0 | 0.0 | 9.2 | 5.8 | 0.0 | 0.0 | 0.0 | 1.2 | 0.0 |
| Embodiment 8 | mol % | 6.0 | 76.7 | 0.0 | 0.0 | 5.4 | 9.5 | 0.0 | 2.3 | 0.0 | 0.0 | 0.0 |
| Embodiment 9 | mol % | 2.9 | 74.3 | 0.0 | 0.0 | 5.8 | 11.1 | 0.0 | 0.0 | 0.0 | 4.3 | 1.7 |
| Embodiment 10 | mol % | 6.9 | 63.5 | 0.0 | 0.0 | 1.1 | 11.6 | 0.0 | 0.0 | 0.0 | 0.0 | 16.8 |
| Embodiment 11 | mol % | 11.2 | 69.3 | 2.5 | 0.0 | 8.1 | 0.0 | 0.0 | 0.0 | 0.0 | 0.0 | 8.8 |

TABLE 2-continued

|  |  |  |  |  |  |  |  |  |  |  |  |
|---|---|---|---|---|---|---|---|---|---|---|---|
| Embodiment 12 | mol % | 19.6 | 47.9 | 3.5 | 12.0 | 0.0 | 0.0 | 3.6 | 1.3 | 0.0 | 11.0 | 0.0 |
| Embodiment 13 | mol % | 6.5 | 45.1 | 2.3 | 10.1 | 0.0 | 0.0 | 0.0 | 8.6 | 7.5 | 8.5 | 5.0 |
| Embodiment 14 | mol % | 52.5 | 0.0 | 2.5 | 0.0 | 0.0 | 0.0 | 0.0 | 0.0 | 0.0 | 0.0 | 20.0 |

|  |  | $La_2O_3$ | $Gd_2O_3$ | $Y_2O_3$ | $ZrO_2$ | $Ta_2O_5$ | $TiO_2$ | Total | $Tg_{TMA}$ (° C.) | Ts (° C.) | α100-300 (1/K) | FA |
|---|---|---|---|---|---|---|---|---|---|---|---|---|
| Embodiment 1 | mol % | 9.9 | 0.0 | 0.0 | 4.5 | 0.00 | 0.00 | 100.0 | 645 | 680 | 71 | 70 |
| Embodiment 2 | mol % | 6.5 | 0.0 | 0.0 | 0.0 | 0.00 | 0.00 | 100.0 | 625 | 655 | 84 | 130 |
| Embodiment 3 | mol % | 0.0 | 0.0 | 0.0 | 0.0 | 0.00 | 0.00 | 100.0 | 650 | 690 | 63 | 110 |
| Embodiment 4 | mol % | 0.0 | 0.0 | 0.0 | 0.0 | 0.00 | 0.00 | 100.0 | 660 | 685 | 71 | 130 |
| Embodiment 5 | mol % | 0.0 | 0.0 | 0.0 | 0.0 | 0.00 | 1.70 | 100.0 | 625 | 670 | 74 | 150 |
| Embodiment 6 | mol % | 0.4 | 0.0 | 0.0 | 0.0 | 0.00 | 0.00 | 100.0 | 474 | 517 | 104 | 110 |
| Embodiment 7 | mol % | 0.0 | 0.0 | 0.0 | 0.0 | 0.00 | 0.00 | 100.0 | 565 | 625 | 89 | 100 |
| Embodiment 8 | mol % | 0.0 | 0.0 | 0.0 | 0.0 | 0.00 | 0.00 | 100.0 | 550 | 615 | 90 | 110 |
| Embodiment 9 | mol % | 0.0 | 0.0 | 0.0 | 0.0 | 0.00 | 0.00 | 100.0 | 505 | 550 | 105 | 120 |
| Embodiment 10 | mol % | 0.0 | 0.0 | 0.0 | 0.0 | 0.00 | 0.00 | 100.0 | 560 | 625 | 91 | 120 |
| Embodiment 11 | mol % | 0.0 | 0.0 | 0.0 | 0.0 | 0.00 | 0.00 | 100.0 | 525 | 595 | 54 | 100 |
| Embodiment 12 | mol % | 1.0 | 0.0 | 0.0 | 0.0 | 0.00 | 0.00 | 100.0 | 540 | 585 | 89 | 100 |
| Embodiment 13 | mol % | 1.8 | 0.0 | 0.0 | 3.1 | 0.00 | 1.55 | 100.0 | 548 | 595 | 84 | 160 |
| Embodiment 14 | mol % | 12.5 | 7.5 | 0.0 | 5.0 | 0.00 | 0.00 | 100.0 | 614 | 653 | 67 | 60 |

TABLE 3

|  |  | $P_2O_5$ | $B_2O_3$ | $SiO_2$ | $Al_2O_3$ | $Li_2O$ | $Na_2O$ | $K_2O$ | MgO | CaO | SrO | BaO |
|---|---|---|---|---|---|---|---|---|---|---|---|---|
| Embodiment 15 | mol % | 30.0 | 6.5 | 0.0 | 3.5 | 13.0 | 0.0 | 0.0 | 15.0 | 15.0 | 0.0 | 15.0 |
| Embodiment 16 | mol % | 27.5 | 20.0 | 0.0 | 2.5 | 10.0 | 2.5 | 2.5 | 17.5 | 12.5 | 2.5 | 2.5 |
| Embodiment 17 | mol % | 27.5 | 25.0 | 0.0 | 2.5 | 10.0 | 0.0 | 2.5 | 12.5 | 12.5 | 5.0 | 2.5 |
| Embodiment 18 | mol % | 25.0 | 30.0 | 0.0 | 2.5 | 10.0 | 0.0 | 2.5 | 12.5 | 12.5 | 2.5 | 2.5 |
| Embodiment 19 | mol % | 45.4 | 0.0 | 0.0 | 3.8 | 0.0 | 0.0 | 0.0 | 0.0 | 0.0 | 0.0 | 48.5 |
| Embodiment 20 | mol % | 0.0 | 28.0 | 20.0 | 0.0 | 0.0 | 0.0 | 0.0 | 0.0 | 0.0 | 30.0 | 20.0 |
| Embodiment 21 | mol % | 0.0 | 25.0 | 25.0 | 0.0 | 0.0 | 0.0 | 0.0 | 0.0 | 0.0 | 10.0 | 30.0 |
| Embodiment 22 | mol % | 0.0 | 35.0 | 15.0 | 0.0 | 0.0 | 0.0 | 2.0 | 0.0 | 24.0 | 0.0 | 24.0 |
| Embodiment 23 | mol % | 0.0 | 31.0 | 21.0 | 0.0 | 0.0 | 0.0 | 0.0 | 0.0 | 6.0 | 6.0 | 36.0 |
| Embodiment 24 | mol % | 0.0 | 20.0 | 35.0 | 0.0 | 0.0 | 0.0 | 5.0 | 0.0 | 5.0 | 0.0 | 35.0 |
| Embodiment 25 | mol % | 0.0 | 30.0 | 25.0 | 0.0 | 0.0 | 0.0 | 15.0 | 0.0 | 0.0 | 0.0 | 30.0 |
| Embodiment 26 | mol % | 0.0 | 30.0 | 25.0 | 0.0 | 0.0 | 15.0 | 0.0 | 0.0 | 0.0 | 0.0 | 30.0 |
| Embodiment 27 | mol % | 0.0 | 30.0 | 25.0 | 0.0 | 15.0 | 0.0 | 0.0 | 0.0 | 0.0 | 0.0 | 30.0 |
| Embodiment 28 | mol % | 0.0 | 30.0 | 25.0 | 0.0 | 0.0 | 0.0 | 10.0 | 0.0 | 0.0 | 0.0 | 30.0 |
| Embodiment 29 | mol % | 0.0 | 30.0 | 25.0 | 0.0 | 0.0 | 0.0 | 15.0 | 0.0 | 0.0 | 0.0 | 10.0 |
| Embodiment 30 | mol % | 0.0 | 30.0 | 25.0 | 0.0 | 0.0 | 0.0 | 20.0 | 10.0 | 0.0 | 0.0 | 15.0 |
| Embodiment 31 | mol % | 0.0 | 40.0 | 25.0 | 0.0 | 0.0 | 0.0 | 30.0 | 0.0 | 0.0 | 0.0 | 0.0 |
| Embodiment 32 | mol % | 0.0 | 30.0 | 25.0 | 0.0 | 0.0 | 0.0 | 0.0 | 0.0 | 0.0 | 0.0 | 45.0 |
| Embodiment 33 | mol % | 0.0 | 30.0 | 25.0 | 0.0 | 0.0 | 0.0 | 0.0 | 5.0 | 0.0 | 0.0 | 40.0 |
| Embodiment 34 | mol % | 0.0 | 30.0 | 25.0 | 0.0 | 0.0 | 0.0 | 0.0 | 0.0 | 5.0 | 0.0 | 40.0 |
| Embodiment 35 | mol % | 0.0 | 30.0 | 25.0 | 0.0 | 0.0 | 0.0 | 0.0 | 0.0 | 0.0 | 5.0 | 40.0 |

TABLE 3-continued

| | | | | | | | | | | | | |
|---|---|---|---|---|---|---|---|---|---|---|---|---|
| Embodiment 36 | mol % | 0.0 | 30.0 | 25.0 | 0.0 | 0.0 | 0.0 | 0.0 | 0.0 | 0.0 | 0.0 | 40.0 |
| Embodiment 37 | mol % | 0.0 | 19.6 | 47.9 | 3.5 | 12.0 | 0.0 | 0.0 | 3.6 | 1.3 | 0.0 | 11.0 |
| Embodiment 38 | mol % | 0.0 | 8.6 | 53.1 | 2.2 | 23.2 | 0.0 | 1.1 | 0.0 | 0.0 | 0.0 | 8.1 |
| Embodiment 39 | mol % | 0.0 | 52.5 | 0.0 | 2.5 | 0.0 | 0.0 | 0.0 | 0.0 | 0.0 | 0.0 | 0.0 |

| | | ZnO | La$_2$O$_3$ | Gd$_2$O$_3$ | Y$_2$O$_3$ | Total | Tg-TMA (° C.) | Ts (° C.) | α100-300 (1/K) | DHNO3 (wt %/min) |
|---|---|---|---|---|---|---|---|---|---|---|
| Embodiment 15 | mol % | 2.0 | 0.0 | 0.0 | 0.0 | 100.0 | 489 | 532 | 120 | 0.16% |
| Embodiment 16 | mol % | 0.0 | 0.0 | 0.0 | 0.0 | 100.0 | 484 | 528 | 112 | 0.25% |
| Embodiment 17 | mol % | 0.0 | 0.0 | 0.0 | 0.0 | 100.0 | 497 | 540 | 101 | 0.21% |
| Embodiment 18 | mol % | 0.0 | 0.0 | 0.0 | 0.0 | 100.0 | 498 | 542 | 91 | 0.29% |
| Embodiment 19 | mol % | 0.0 | 0.0 | 2.3 | 0.0 | 100.0 | 558 | 602 | 140 | 0.02% |
| Embodiment 20 | mol % | 0.0 | 0.0 | 0.0 | 2.0 | 100.0 | 586 | 625 | 110 | 0.17% |
| Embodiment 21 | mol % | 10.0 | 0.0 | 0.0 | 0.0 | 100.0 | 578 | 628 | 103 | 0.15% |
| Embodiment 22 | mol % | 0.0 | 0.0 | 0.0 | 0.0 | 100.0 | 607 | 664 | 108 | 0.14% |
| Embodiment 23 | mol % | 0.0 | 0.0 | 0.0 | 0.0 | 100.0 | 581 | 625 | 107 | 0.15% |
| Embodiment 24 | mol % | 0.0 | 0.0 | 0.0 | 0.0 | 100.0 | 576 | 635 | 109 | 0.17% |
| Embodiment 25 | mol % | 0.0 | 0.0 | 0.0 | 0.0 | 100.0 | 467 | 516 | 133 | 0.14% |
| Embodiment 26 | mol % | 0.0 | 0.0 | 0.0 | 0.0 | 100.0 | 472 | 515 | 126 | 0.17% |
| Embodiment 27 | mol % | 0.0 | 0.0 | 0.0 | 0.0 | 100.0 | 495 | 530 | 107 | 0.16% |
| Embodiment 28 | mol % | 5.0 | 0.0 | 0.0 | 0.0 | 100.0 | 509 | 559 | 117 | 0.12% |
| Embodiment 29 | mol % | 20.0 | 0.0 | 0.0 | 0.0 | 100.0 | 520 | 567 | 105 | 0.16% |
| Embodiment 30 | mol % | 0.0 | 0.0 | 0.0 | 0.0 | 100.0 | 460 | 506 | 133 | 0.16% |
| Embodiment 31 | mol % | 5.0 | 0.0 | 0.0 | 0.0 | 100.0 | 466 | 505 | 147 | 0.36% |
| Embodiment 32 | mol % | 0.0 | 0.0 | 0.0 | 0.0 | 100.0 | 580 | 620 | 107 | 0.16% |
| Embodiment 33 | mol % | 0.0 | 0.0 | 0.0 | 0.0 | 100.0 | 591 | 630 | 102 | 0.21% |
| Embodiment 34 | mol % | 0.0 | 0.0 | 0.0 | 0.0 | 100.0 | 592 | 632 | 106 | 0.17% |
| Embodiment 35 | mol % | 0.0 | 0.0 | 0.0 | 0.0 | 100.0 | 592 | 632 | 105 | 0.15% |
| Embodiment 36 | mol % | 5.0 | 0.0 | 0.0 | 0.0 | 100.0 | 586 | 627 | 102 | 0.18% |
| Embodiment 37 | mol % | 0.0 | 1.0 | 0.0 | 0.0 | 100.0 | 540 | 585 | 104 | 0.05% |
| Embodiment 38 | mol % | 3.2 | 0.4 | 0.0 | 0.0 | 100.0 | 474 | 517 | 89 | 0.03% |
| Embodiment 39 | mol % | 20.0 | 12.5 | 7.5 | 0.0 | 100.0 | 614 | 653 | 67 | 0.01% |

In the table,
Tg-TMA: Glass transition temperature
Ts: Sag temperature
α(alpha)100-300: Coefficient of linear expansion of high temperature range (100-300° C.)
FA: Degree of abrasion
D-HNO$_3$: Etching rate The etching rate was the average weight reduction rate per minute (wt %/min) when placed in 0.1N nitric acid (HNO$_3$) at 50° C. for 10 to 25 minutes. Employing samples 360 mm$^3$ in volume with surface areas of 325 mm$^2$, the average rate of reduction in thickness per minute for an average weight reduction rate per minute of 0.1 (wt %/min) was given by 0.1 (wt %/min)×360/325≈(nearly equal to) 1.1 (micrometers/minute).

In the composition of the covering portion, although a slight reduction in low-boiling-point components was observed by surface analysis by SIMS and the like, elements derived from glass A were confirmed. The difference in composition between glass A and the covering portion was of a degree that did not compromise the object of the present invention.

Next, a carbon-containing film was formed on the surface of the above glass piece after covering. That is, a glass piece that had been provided with a covering portion was placed in a reaction vessel and the air in the reaction vessel was exhausted. When hydrocarbon (acetylene gas was employed here) was introduced and thermally decomposed, a carbon film formed on the surface of the glass material. The reaction temperature was 480° C.

The above-described glass piece following covering was employed as a glass material in press molding. That is, a pressing mold comprised of a sleeve mold and upper and lower molds made of SiC was employed. A carbon-containing mold release film was formed on the pressing surfaces of the upper and lower molds by sputtering. The glass material was heated to a temperature at which glass A exhibited a viscosity of $10^{7.2}$ dPa.s and fed into a pressing mold that had been heated to a temperature at which glass A exhibited a viscosity of $10^{8.5}$ dPa.s. During feeding, the glass material was maintained on a separable mold with air blowing and softened by heating. The mold was then separated, causing the glass material to drop onto the lower mold.

Immediately after feeding, the glass material was pressed between the upper and lower molds, and, while maintaining tight contact between the glass and the upper and lower molds, cooled to a temperature below the annealing temperature of glass A. The molded product was then removed from within the pressing mold.

One hundred continuous moldings were conducted by the above press molding. No visible surface reaction marks, fusion marks or clouding was found on the surface of the molded products. Nor did the pressing surfaces of the pressing mold exhibit problems such as surface roughness.

The molded products obtained were maintained for 2 hours in a 440° C. heating furnace, and then annealed by reducing the temperature by −50° C./hour. Following annealing, the cores of the molded products were removed with a centering and edging machine, the outer perimeter of the molded products was discarded, and the center of the outer diameter was aligned with the optical axis.

Etching was also conducted to remove the covering portion of the surface of the molded products. Specifically, the molded products were immersed for 300 seconds in a 0.1N $HNO_3$ aqueous solution at 50° C., drawn out, washed with water, and dried.

Finally, an antireflective film was formed on the washed molded products to obtain glass lenses. The glass lenses formed from the glass materials of Embodiments 1 to 39 fully met the specifications of optical apparatuses in terms of shape precision and external appearance.

Comparative Example 1

For comparison, samples having only carbon-containing films were fabricated without providing covering portions on the surface of glass pieces comprised of optical glass A that had been preformed as set forth above. When the comparative samples were subjected to the same continuous pressing as that set forth above, scratchlike surface reaction marks were seen on the surface of the molded product beginning with the very first piece. Observation of the pressing mold after pressing 20 pieces revealed that carbon and fusion products considered to be reaction products of carbon and glass had adhered to the surface.

Embodiments 40 to 56

The various fluorine-containing multicomponent optical glasses C of Embodiments 40 to 56 in Table 4 (Tg=429° C., nd=1.4940, v(nu)d=81.92, FA=490) were employed to form convex meniscus-shaped glass lenses.

TABLE 4

| Core glass C | $P^{5+}$ | $Al^{3+}$ | $Li^+$ | $Na^+$ | $Mg^{2+}$ | $Ca^{2+}$ | $Sr^{2+}$ | $Ba^{2+}$ | $Y^{3+}$ | $La^{3+}$ | $Gd^{3+}$ | Total | $O^{2+}$ | $F^-$ | Tg(° C.) | nd | vd |
|---|---|---|---|---|---|---|---|---|---|---|---|---|---|---|---|---|---|
| Embodiment 40 | 26 | 20 | 4 | 0 | 10 | 14 | 15 | 10 | 1 | 0 | 0 | 100 | 35.9 | 64.1 | 429 | 1.4940 | 81.92 |
| Embodiment 41 | 29 | 11 | 12 | 0 | 8 | 10 | 17 | 12 | 1 | 0 | 0 | 100 | 43.5 | 56.5 | 375 | 1.5145 | 77.36 |
| Embodiment 42 | 26 | 21 | 8 | 0 | 7.49 | 9.36 | 15.9 | 11.25 | 1 | 0 | 0 | 100 | 36.5 | 63.5 | 406 | 1.4950 | 81.7 |
| Embodiment 43 | 25 | 20 | 16 | 0 | 6.48 | 8.1 | 13.77 | 9.65 | 1 | 0 | 0 | 100 | 36.6 | 63.4 | 375 | 1.4919 | 81.7 |
| Embodiment 44 | 14 | 29.38 | 5 | 0 | 3.91 | 22.39 | 14.52 | 8.2 | 2.6 | 0 | 0 | 100 | 18.5 | 81.5 | 404 | 1.4579 | 90.14 |
| Embodiment 45 | 38 | 9 | 21 | 0 | 6 | 4 | 5 | 16 | 1 | 0 | 0 | 100 | 66.5 | 33.5 | 374 | 1.5499 | 71.5 |
| Embodiment 46 | 38 | 9 | 21 | 0 | 6 | 4 | 5 | 16 | 1 | 0 | 0 | 100 | 72.6 | 27.4 | 392 | 1.5577 | 70.8 |
| Embodiment 47 | 29 | 9 | 21 | 0 | 6 | 4 | 5 | 23 | 3 | 0 | 0 | 100 | 57.1 | 42.9 | 367 | 1.5457 | 72.6 |
| Embodiment 48 | 29 | 9 | 21 | 0 | 6 | 4 | 5 | 23 | 1 | 2 | 0 | 100 | 57.1 | 42.9 | 366 | 1.5478 | 72.3 |
| Embodiment 49 | 29 | 9 | 21 | 0 | 6 | 4 | 5 | 23 | 1 | 0 | 2 | 100 | 57.1 | 42.9 | 368 | 1.5472 | 72.3 |
| Embodiment 50 | 27.4 | 20.9 | 0 | 0 | 8.3 | 14.2 | 16.9 | 11.7 | 0.6 | 0 | 0 | 100 | 37.1 | 62.9 | 455 | 1.4971 | 81.6 |
| Embodiment 51 | 24 | 23 | 8 | 0 | 7.5 | 9.4 | 15.9 | 11.2 | 1 | 0 | 0 | 100 | 33.3 | 66.7 | 399 | 1.4820 | 83.1 |
| Embodiment 52 | 24 | 21 | 8 | 0 | 7.8 | 9.8 | 16.6 | 11.8 | 1 | 0 | 0 | 100 | 33.3 | 66.7 | 396 | 1.4908 | 82.9 |
| Embodiment 53 | 31 | 9 | 21 | 0 | 6 | 4 | 5 | 23 | 1 | 0 | 0 | 100 | 58.4 | 41.6 | 347 | 1.5409 | 72.4 |
| Embodiment 54 | 38 | 9 | 21 | 0 | 6 | 4 | 5 | 16 | 1 | 0 | 0 | 100 | 66.5 | 33.5 | 369 | 1.5509 | 71.1 |
| Embodiment 55 | 14.52 | 33.88 | 0 | 0 | 3.91 | 22.39 | 14.52 | 8.2 | 2.58 | 0 | 0 | 100 | 18.4 | 81.6 | 440 | 1.4565 | 90.3 |
| Embodiment 56 | 6.68 | 33.25 | 0 | 2.17 | 6.74 | 27.35 | 16.93 | 5.63 | 1.25 | 0 | 0 | 100 | 8.6 | 91.4 | 425 | 1.4350 | 95.0 |

First, a melt of optical glass C was dripped onto a receiving mold, cooled, and preformed to obtain biconvex round surface glass pieces in the form of flattened spheres. Next, the multicomponent glass (FA=110) of Embodiment 6 in Table 2 was employed as target to form covering portions 15 nm in thickness on the surface of the preformed glass pieces by sputtering.

Next, a carbon-containing film was formed on the surface of the glass pieces after the above covering. That is, a glass piece that had been provided with a covering portion was placed in a reaction vessel and the air in the reaction vessel was exhausted. When hydrocarbon (acetylene gas was employed here) was introduced and thermally decomposed, a carbon film formed on the surface of the glass material.

After forming the carbon film, press molding was conducted employing the above-described glass pieces as the glass material. That is, a pressing mold comprised of a sleeve mold and upper and lower molds made of SiC, with a carbon-containing mold release film formed on the pressing surfaces of the upper and lower molds by sputtering, was heated to a temperature corresponding to a glass C viscosity of $10^{8.5}$ dPa.s. A glass material that had been heated to a temperature corresponding to a glass C viscosity of $10^{7.2}$ dPa.s was fed. During feeding, the glass material was maintained on a separable mold with air blowing and softened by heating. The mold was then separated, causing the glass material to drop onto the lower mold.

Immediately after feeding, the glass material was pressed between the upper and lower molds, and with tight contact being maintained between the glass and the upper and lower molds, cooled to a temperature below the annealing temperature of glass A. The molded product was then removed from within the pressing mold. One hundred continuous moldings were conducted by the above press molding.

The molded product thus obtained was then maintained for 2 hours in a heating furnace, and annealed by decreasing the temperature by −50° C./hour.

Following annealing, the molded products were subjected to centering and edging with a centering and edging machine, the outer perimeter of the molded products was discarded, and the center of the outer diameter was aligned with the optical axis. Evaluation of the molded product with a magnifying glass after centering and edging revealed that in about 10 percent of the molded products, annular scratches were observed at spots that had been bell chucked with the bell member of the centering and edging machine during centering and edging.

Etching was then conducted to remove the covering portion on the surface of the molded product. Specifically, the molded product was immersed in a 0.1 N $HNO_3$ aqueous solution at 50° C. for 300 seconds, cleaned with water upon being withdrawn, and dried.

Finally, an antireflective film was formed on the molded product after cleaning to obtain a glass lens.

One hundred glass lenses obtained as set forth above were evaluated. As a result, in the glass lenses formed from the glass materials of Embodiments 40 to 56, scratches caused on the optically functional surfaces of the lenses in the centering and edging step were removed along with the covering portion. These lenses thus all fully met the specifications of optical apparatuses for both shape precision and external appearance.

Comparative Example 2

For comparison, samples having only carbon-containing films were fabricated without providing a covering portion on the surface of glass pieces comprised of optical glass B that had been preformed as set forth above. The comparative samples were subjected to the same continuous pressing as that set forth above, annealed after press molding, and subjected to centering and edging with a centering and edging machine in the same manner as in the above embodiments to remove the outer perimeter of the molded products. When the molded products were evaluated with a magnifying glass after centering and edging, among the glass lenses obtained from the glass materials of Embodiments 40 to 56, about 85 percent of the molded products exhibited annular scratches on optically functional surfaces. After washing the molded products, antireflective films were formed on the surfaces thereof to obtain glass lenses, but there was an external appearance failure rate of about 85 percent.

[Industrial Applicability]

The present invention can be employed in the field of manufacturing optical glass elements such as glass lenses.

The invention claimed is:

1. A glass material for mold pressing, comprising:
a core portion having a multicomponent optical first glass containing at least one readily reducible component selected from the group consisting of W, Ti, Bi, and Nb, and
a covering portion covering the surface of said core portion, having a multicomponent second glass containing none or a lower quantity of said readily reducible component than is contained in said core portion,
wherein the etching rate of the first glass, denoted as D2, and the etching rate of the second glass, denoted as D1, respectively, are such that:

$D1 > D2$ (wherein $D1 = 0.01$ to $0.50$ and $D2 = 0.000$ to $0.05$), and wherein the covering portion has a thickness ranging from 0.1 to 100 nm.

2. The glass material in accordance with claim 1, wherein said first glass contains a total of 5 mol percent or more of said readily reducible component.

3. The glass material in accordance with claim 2, wherein said first glass is an optical glass comprising, denoted as mol percentages, 15 to 45 percent of $P_2O_5$, 3 to 35 percent of $Nb_2O_5$, 2 to 35 percent of $Li_2O$, 0 to 20 percent of $TiO_2$, 0 to 40 percent of $WO_3$, 0 to 20 percent of $Bi_2O_3$, 0 to 30 percent of $B_2O_3$, 0 to 25 percent of BaO, 0 to 25 percent of ZnO, 0 to 20 percent of MgO, 0 to 20 percent of CaO, 0 to 20 percent of SrO, 0 to 30 percent of $Na_2O$, 0 to 30 percent of $K_2O$ (where the total quantity of $Li_2O$, $Na_2O$, and $K_2O$ is 45 percent or less), 0 to 15 percent of $Al_2O_3$, 0 to 15 percent of $SiO_2$, 0 to 10 percent of $La_2O_3$, 0 to 10 percent of $Gd_2O_3$, 0 to 10 percent of $Yb_2O_3$, 0 to 10 percent of $ZrO_2$, and 0 to 10 percent of $Ta_2O_5$.

4. The glass material in accordance with claim 2, wherein said first glass is an optical glass comprising, denoted as mol percentages, 0 to 40 percent of $SiO_2$, 4 to 50 percent of $Bi_2O_3$, 0 to 30 percent of $Li_2O$, 0 to 25 percent of $Na_2O$, 0 to 20 percent of $K_2O$, 0 to 40 percent of ZnO, 0 to 15 percent of CaO, 0 to 15 percent of BaO, 0 to 15 percent of SrO, 0 to 20 percent of MgO, 1 to 25 percent of $La_2O_3$, 0 to 20 percent of $Gd_2O_3$, 0 to 15 percent of $Yb_2O_3$, 0 to 30 percent of $Nb_2O_3$, 0 to 20 percent of $W0_3$, 0 to 40 percent of $TiO_2$, and 0 to 20 percent of $Bi_2O_3$.

5. The glass material in accordance with claim 1, wherein said first glass is an optical glass comprising, denoted as mol percentages, 15 to 45 percent of $P_2O_5$, 3 to 35 percent of $Nb_2O_5$, 2 to 35 percent of $Li_2O$, 0 to 20 percent of $TiO_2$, 0 to 40 percent of $WO_3$, 0 to 20 percent of $Bi_2O_3$, 0 to 30 percent of $B_2O_3$, 0 to 25 percent of BaO, 0 to 25 percent of ZnO, 0 to 20 percent of MgO, 0 to 20 percent of CaO, 0 to 20 percent of SrO, 0 to 30 percent of $Na_2O$, 0 to 30 percent of $K_2O$ (where the total quantity of $Li_2O$, $Na_2O$, and $K_2O$ is 45 percent or less), 0 to 15 percent of $Al_2O_3$, 0 to 15 percent of $SiO_2$, 0 to 10 percent of $La_2O_3$, 0 to 10 percent of $Gd_2O_3$, 0 to 10 percent of $Yb_2O_3$, 0 to 10 percent of $ZrO_2$, and 0 to 10 percent of $Ta_2O_5$.

6. The glass material in accordance with claim 1, wherein said first glass is an optical glass comprising, denoted as mol percentages, 0 to 40 percent of $SiO_2$, 4 to 50 percent of $Bi_2O_3$, 0 to 30 percent of $Li_2O$, 0 to 25 percent of $Na_2O$, 0 to 20 percent of $K_2O$, 0 to 40 percent of ZnO, 0 to 15 percent of CaO, 0 to 15 percent of BaO, 0 to 15 percent of SrO, 0 to 20 percent of MgO, 1 to 25 percent of $La_2O_3$, 0 to 20 percent of $Gd_2O_3$, 0 to 15 percent of $Yb_2O_3$, 0 to 30 percent of $Nb_2O_3$, 0 to 20 percent of $WO_3$, 0 to 40 percent of $TiO_2$, and 0 to 20 percent of $Bi_2O_3$.

7. The glass material in accordance with claim 1, wherein glasses are selected so that the glass transition temperatures Tg of the first and second glasses, denoted as and Tg2, respectively, and the sag temperature Ts of the first glass, denoted as Ts1, satisfy the following relation:

$Tg1 < Tg2 < Ts1$.

8. The glass material in accordance with claim 1, wherein glasses are selected so that the glass transition temperatures Tg of the first and second glasses, denoted as Tg1 and Tg2, respectively, and the sag temperature Ts of the second glass, denoted as Ts2, satisfy the following relation:

$Tg2 < Tg1 < Ts2$.

9. The glass material in accordance with claim 1, wherein glasses are selected so that the glass transition temperatures Tg of the first and second glasses, denoted as Tg1 and Tg2, respectively, satisfy the following relation:

$Tg1 - 20°C. < Tg2 < Tg1 + 20°C$.

10. The glass material in accordance with claim 1, wherein glasses are selected so that the glass transition temperatures Tg of the first and second glasses, denoted as Tg1 and Tg2, respectively; the sag temperatures Ts of the first glass, denoted as Ts1; and the temperatures at which the first glass exhibits a viscosity of $1/1,000$ or more the viscosity exhibited at the softening point of the respective glasses (viscosity=$10^{7.6}$ dPa.s), denoted as T1 (where T1>Ts1), satisfy the following relation:

$Ts1 < Tg2 < T1$.

11. The glass material in accordance with claim 1, wherein glasses are selected so that the glass transition temperatures Tg of the first and second glasses, denoted as Tg1 and Tg2, respectively; the sag temperature Ts of the second glass, denoted as Ts2; and the temperatures at which the second glass exhibits a viscosity of $1/100$ or more the viscosity exhibited at the softening point of the respective glasses (viscosity=$10^{7.6}$ dPa.s), denoted as T2 (where T2>Ts2), satisfy the following relation:

$Ts2 < Tg1 < T2$.

12. The glass material in accordance with claim 1, wherein glasses are selected so that the glass transition temperatures Tg of the first and second glasses, denoted as Tg1 and Tg2, respectively, satisfy the following relation:

$(Tg1-120°C.) \leq Tg2 \leq 800°C$.

13. The glass material in accordance with claim 1, wherein glasses are selected so that the average coefficients of linear expansion at 100 to 300° C. of the first and second glasses, denoted as $\alpha(alpha)h1$, $\alpha(alpha)h2$, satisfy the following relations:

$\alpha(alpha)h2 \times 0.8 < \alpha(alpha)h1 < \alpha(alpha)h2 \times 1.2$.

14. The glass material in accordance with claim 1, wherein the ratio of the weight reduction rate of the second glass to that of the first glass when subjected to a prescribed acid or alkali treatment is 10 or more.

15. The glass material in accordance with claim 1, characterized in that a carbon-containing film is present on the surface of the covering portion.

* * * * *

UNITED STATES PATENT AND TRADEMARK OFFICE
CERTIFICATE OF CORRECTION

PATENT NO.        : 8,703,295 B2                                              Page 1 of 1
APPLICATION NO.   : 12/295610
DATED             : April 22, 2014
INVENTOR(S)       : Zou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1449 days.

Signed and Sealed this

Twenty-ninth Day of September, 2015

Michelle K. Lee
*Director of the United States Patent and Trademark Office*